United States Patent
Anglin et al.

(10) Patent No.: US 11,901,553 B2
(45) Date of Patent: *Feb. 13, 2024

(54) BATTERY INCLUDING BETA-DELITHIATED LAYERED NICKLE OXIDE ELECTROCHEMICALLY ACTIVE CATHODE MATERIAL

(71) Applicant: DURACELL U.S. OPERATIONS, INC., Wilmington, DE (US)

(72) Inventors: David Lloyd Anglin, Brookfield, CT (US); Jennifer Anne Nelson, Waltham, MA (US); Paul Albert Christian, Norton, MA (US); Thomas C. Richards, Woodbury, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/698,670

(22) Filed: Mar. 18, 2022

(65) Prior Publication Data

US 2022/0209233 A1 Jun. 30, 2022

Related U.S. Application Data

(63) Continuation of application No. 16/222,087, filed on Dec. 17, 2018, now Pat. No. 11,316,159, which is a
(Continued)

(51) Int. Cl.
*H01M 4/525* (2010.01)
*H01M 6/50* (2006.01)
(Continued)

(52) U.S. Cl.
CPC .............. *H01M 4/525* (2013.01); *H01M 4/06* (2013.01); *H01M 4/131* (2013.01); *H01M 4/244* (2013.01);
(Continued)

(58) Field of Classification Search
CPC .............. H01M 10/30; H01M 10/488; H01M 2004/021; H01M 2300/0085; H01M 4/06;
(Continued)

(56) References Cited

U.S. PATENT DOCUMENTS 2,956,860 A 10/1960 Welsch et al.
3,437,435 A 4/1969 Moore et al.
(Continued)

FOREIGN PATENT DOCUMENTS

CA 1263697 A 12/1989
EP 0702421 A1 3/1996
(Continued)

OTHER PUBLICATIONS

Synthesis and electrode performance of layered nickel dioxide containing alkaline ions; Arai, Hajime; NTT Microsystem Integration Laboratories, Japan (Year: 2004).*
(Continued)

*Primary Examiner* — Sarah A. Slifka
(74) *Attorney, Agent, or Firm* — MARSHALL, GERSTEIN & BORUN LLP

(57) ABSTRACT

The invention is directed towards a battery. The battery includes a cathode, an anode, a separator between the cathode and the anode, and an electrolyte. The cathode includes a conductive additive and an electrochemically active cathode material. The electrochemically active cathode material includes a beta-delithiated layered nickel oxide. The beta-delithiated layered nickel oxide has a chemical formula. The chemical formula is $Li_xA_yNi_{1+a-z}M_zO_2 \cdot nH_2O$ where x is from about 0.02 to about 0.20; y is from about 0.03 to about 0.20; a is from about 0 to about 0.2; z is from about 0 to about 0.2; and n is from about 0 to about 1. Within the chemical formula, A is an alkali metal. The alkali metal includes potassium, rubidium, cesium, and any combination
(Continued)

thereof. Within the chemical formula, M comprises an alkaline earth metal, a transition metal, a non-transition metal, and any combination thereof. The anode includes an electrochemically active anode material. The electrochemically active anode material includes zinc, zinc alloy, and any combination thereof.

13 Claims, 3 Drawing Sheets

Related U.S. Application Data continuation of application No. 15/785,346, filed on Oct. 16, 2017, now Pat. No. 10,158,118, which is a continuation of application No. 14/672,303, filed on Mar. 30, 2015, now Pat. No. 9,793,543.

(60) Provisional application No. 61/971,667, filed on Mar. 28, 2014.

(51) Int. Cl.
| | |
|---|---|
| H01M 4/06 | (2006.01) |
| H01M 4/24 | (2006.01) |
| H01M 4/36 | (2006.01) |
| H01M 4/52 | (2010.01) |
| H01M 4/131 | (2010.01) |
| H01M 4/32 | (2006.01) |
| H01M 10/30 | (2006.01) |
| H01M 6/04 | (2006.01) |
| H01M 4/38 | (2006.01) |
| H01M 10/48 | (2006.01) |
| H01M 4/02 | (2006.01) |
| F02M 51/02 | (2006.01) |

(52) U.S. Cl.
CPC ............ *H01M 4/32* (2013.01); *H01M 4/366* (2013.01); *H01M 4/38* (2013.01); *H01M 4/52* (2013.01); *H01M 6/04* (2013.01); *H01M 6/505* (2013.01); *H01M 6/5083* (2013.01); *H01M 10/30* (2013.01); *H01M 10/488* (2013.01); *F02M 51/02* (2013.01); *H01M 2004/021* (2013.01); *H01M 2300/0085* (2013.01)

(58) Field of Classification Search
CPC ........ H01M 4/131; H01M 4/244; H01M 4/32; H01M 4/366; H01M 4/38; H01M 4/52; H01M 4/525; H01M 6/04; H01M 6/505; H01M 6/5083

See application file for complete search history.

(56) References Cited

U.S. PATENT DOCUMENTS

| | | | |
|---|---|---|---|
| 3,520,729 | A | 7/1970 | Voss et al. |
| 4,136,236 | A | 1/1979 | Ruetschi |
| 4,192,914 | A | 3/1980 | Ruetschi |
| 4,246,253 | A | 1/1981 | Hunter |
| 4,312,930 | A | 1/1982 | Hunter |
| 4,383,029 | A | 5/1983 | Yamada et al. |
| 4,451,543 | A | 5/1984 | Dzieciuch et al. |
| 4,777,100 | A | 10/1988 | Chalilpoyil et al. |
| 4,959,282 | A | 9/1990 | Dahn et al. |
| 5,277,890 | A | 1/1994 | Wang et al. |
| 5,283,139 | A | 2/1994 | Newman et al. |
| 5,348,726 | A | 9/1994 | Wang et al. |
| 5,391,365 | A | 2/1995 | Wang et al. |
| 5,396,177 | A | 3/1995 | Kuo et al. |
| 5,425,932 | A | 6/1995 | Tarascon |
| 5,482,796 | A | 1/1996 | Wang et al. |
| 5,532,084 | A | 7/1996 | Wang et al. |
| 5,587,133 | A | 12/1996 | Amatucci et al. |
| 5,626,988 | A | 5/1997 | Daniel-Ivad et al. |
| 5,720,932 | A | 2/1998 | Amine et al. |
| 5,759,510 | A | 6/1998 | Pillai |
| 5,772,890 | A | 6/1998 | Hubred |
| 5,783,334 | A | 7/1998 | Yasuda |
| 5,798,180 | A | 8/1998 | Chowdhury et al. |
| 5,910,366 | A | 6/1999 | Chowdhury et al. |
| 5,952,124 | A | 9/1999 | Kainthla et al. |
| 5,955,052 | A | 9/1999 | Padhi et al. |
| 6,054,234 | A | 4/2000 | Weiss et al. |
| 6,074,784 | A | 6/2000 | Maruta |
| 6,162,561 | A | 12/2000 | Wang et al. |
| 6,265,105 | B1 | 7/2001 | Tokuda et al. |
| 6,270,921 | B1 | 8/2001 | Kaplan et al. |
| 6,284,410 | B1 | 9/2001 | Durkot et al. |
| 6,334,993 | B1 | 1/2002 | Suita et al. |
| 6,335,119 | B1 | 1/2002 | Maruta |
| 6,428,766 | B1 | 8/2002 | Fujino et al. |
| 6,444,364 | B1 | 9/2002 | Harris et al. |
| 6,472,103 | B1 | 10/2002 | Durkot et al. |
| 6,492,062 | B1 | 12/2002 | Wang et al. |
| 6,509,117 | B1 | 1/2003 | Bowden et al. |
| 6,521,378 | B2 | 2/2003 | Durkot et al. |
| 6,566,009 | B1 | 5/2003 | Noya et al. |
| 6,589,693 | B1 | 7/2003 | Kilby et al. |
| 6,617,072 | B2 | 9/2003 | Venkatesan et al. |
| 6,620,550 | B2 | 9/2003 | Christian et al. |
| 6,667,131 | B1 | 12/2003 | Vitins et al. |
| 6,753,109 | B2 | 6/2004 | Nanjundaswamy et al. |
| 6,759,166 | B2 | 7/2004 | Wang et al. |
| 6,783,893 | B2 | 8/2004 | Bowden et al. |
| 6,794,082 | B2 | 9/2004 | Mori et al. |
| 6,818,347 | B1 | 11/2004 | Jin et al. |
| 6,858,349 | B1 | 2/2005 | Luo et al. |
| 6,932,846 | B2 | 8/2005 | Bowden et al. |
| 6,936,378 | B2 | 8/2005 | Randell |
| 6,991,875 | B2 | 1/2006 | Christian et al. |
| 7,045,247 | B1 | 5/2006 | Copeland et al. |
| 7,045,252 | B2 | 5/2006 | Christian et al. |
| 7,081,319 | B2 | 7/2006 | Christian et al. |
| 7,232,628 | B2 | 6/2007 | Randell |
| 7,247,407 | B2 | 7/2007 | Durkot et al. |
| 7,273,680 | B2 | 9/2007 | Durkot et al. |
| 7,314,681 | B2 | 1/2008 | Randell et al. |
| 7,407,521 | B2 | 8/2008 | Shimakawa et al. |
| 7,407,726 | B2 | 8/2008 | Wang et al. |
| 7,435,395 | B2 | 10/2008 | Durkot et al. |
| 7,569,306 | B2 | 8/2009 | Kato et al. |
| 7,763,383 | B2 | 7/2010 | Miyamoto et al. |
| 7,767,336 | B2 | 8/2010 | Ito et al. |
| 7,807,297 | B2 | 10/2010 | Anglin et al. |
| 8,003,254 | B2 | 8/2011 | Bofinger et al. |
| 8,133,615 | B2 | 3/2012 | Johnson |
| 8,303,840 | B2 | 11/2012 | Nanjundaswamy et al. |
| 8,318,350 | B2 | 11/2012 | Johnson |
| 8,691,439 | B2 | 4/2014 | Ndzebet et al. |
| 8,872,963 | B2 | 10/2014 | Omata et al. |
| 8,920,969 | B2 | 12/2014 | Issaev et al. |
| 9,793,542 | B2 | 10/2017 | Nelson et al. |
| 9,793,543 | B2 * | 10/2017 | Anglin ............... H01M 4/244 |
| 10,158,118 | B2 | 12/2018 | Anglin et al. |
| 10,276,869 | B2 | 4/2019 | Nelson et al. |
| 2002/0172867 | A1 | 11/2002 | Anglin |
| 2003/0068549 | A1 | 4/2003 | Daniel-Ivad et al. |
| 2004/0009400 | A1 | 1/2004 | Yamaguchi et al. |
| 2005/0079424 | A1 | 4/2005 | Davis et al. |
| 2005/0152830 | A1 | 7/2005 | Yasutomi et al. |
| 2005/0164086 | A1 | 7/2005 | Bofinger et al. |
| 2005/0221181 | A1 | 10/2005 | Durkot et al. |
| 2006/0093914 | A1 * | 5/2006 | Tanaka ............... C01G 53/54 429/223 |
| 2007/0015054 | A1 | 1/2007 | Nunome et al. |
| 2007/0248879 | A1 | 10/2007 | Durkot et al. |
| 2008/0008937 | A1 | 1/2008 | Eylem et al. |
| 2008/0171266 | A1 | 7/2008 | Kato et al. |
| 2008/0193487 | A1 | 8/2008 | Schild et al. |

(56) References Cited

U.S. PATENT DOCUMENTS

| | | | |
|---|---|---|---|
| 2008/0193847 | A1 | 8/2008 | Suetsugu et al. |
| 2008/0241683 | A1 | 10/2008 | Fensore et al. |
| 2008/0274405 | A1 | 11/2008 | Kobayashi et al. |
| 2009/0047578 | A1 | 2/2009 | Iwamoto et al. |
| 2009/0162745 | A1 | 6/2009 | Iwamoto et al. |
| 2009/0249614 | A1 | 10/2009 | Davis et al. |
| 2009/0258297 | A1 | 10/2009 | Davis et al. |
| 2010/0003596 | A1 | 1/2010 | Sato et al. |
| 2011/0151329 | A1 | 6/2011 | Bernard et al. |
| 2011/0219607 | A1 | 9/2011 | Nanjundaswamy et al. |
| 2011/0223477 | A1 | 9/2011 | Nelson et al. |
| 2011/0223493 | A1 | 9/2011 | Christian et al. |
| 2013/0065112 | A1 | 3/2013 | Uzuka et al. |
| 2013/0247363 | A1 | 9/2013 | Nelson et al. |
| 2013/0248758 | A1 | 9/2013 | Park et al. |
| 2014/0154542 | A1* | 6/2014 | Issaev .............. H01M 6/045 429/207 |
| 2015/0280234 | A1 | 10/2015 | Nelson et al. |
| 2015/0280250 | A1 | 10/2015 | Anglin et al. |
| 2018/0040894 | A1 | 2/2018 | Nelson et al. |
| 2018/0040895 | A1 | 2/2018 | Anglin et al. |
| 2018/0331361 | A1 | 11/2018 | Nelson et al. |
| 2019/0252683 | A1 | 8/2019 | Nelson et al. |

FOREIGN PATENT DOCUMENTS

| | | |
|---|---|---|
| JP | H06511106 A | 12/1994 |
| JP | H08250121 A | 9/1996 |
| JP | H11139830 A | 5/1999 |
| JP | 2001332259 A | 11/2001 |
| JP | 2003151549 A | 5/2003 |
| JP | 2004323331 A | 11/2004 |
| JP | 2005322551 A | 11/2005 |
| JP | 2005332691 A | 12/2005 |
| JP | 2007026896 A | 2/2007 |
| WO | WO-93/06474 A1 | 4/1993 |
| WO | WO-2009/082862 A1 | 7/2009 |
| WO | WO-2010/023531 A2 | 3/2010 |
| WO | WO-2015/148245 A1 | 10/2015 |
| WO | WO-2016/160659 A1 | 10/2016 |

OTHER PUBLICATIONS

Abbas, et al. Hydroxyl as a Defect of the Manganese Dioxide Lattice and its Applications to the Dry Cell Battery. Journal of Power Sources 58, No. 1 (1996): 15-21.

Alcantara, et al. Structure and Electrochemical Properties of $Li_{1-x}(Ni_yCo_{1-y})_{1+x}O_2$ Effect of Chemical Delithiation at 0° C. Journal of the Electrochemical Society 142, No. 12 (1995): 3997-4005.

Ammundsen, et al. Effect of Chemical Extraction of Lithium on the Local Structure of Spinel Lithium Manganese Oxides Determined by X-ray Absorption Spectroscopy. Chemistry of Materials 8, No. 12 (1996): 2799-2808.

Ammundsen, et al. Mechanism of Proton Insertion and Characterization of the Proton Sites in Lithium Manganate Spinels. Chemistry of Materials 7, No. 11 (1995): 2151-2160.

Arai et al., Characterization and cathode performance of $Li_{1-x}Ni_{1-x}O_2$ prepared with the excess lithium method, Solid State Ionics, 80:261-269 (1995).

Arai, et al. Characteristics of $Li_x NiO_2$ Obtained by Chemical Delithiation. Journal of Power Sources 81 (1999): 401-405.

Arai, et al. Nickel Dioxide Polymorphs as Lithium Insertion Electrodes. Electrochimica Acta 47, No. 17 (2002): 2697-2705.

Arai, et al. Structural and Thermal Characteristics of Nickel Dioxide Derived from $LiNiO_2$. Journal of Solid State Chemistry 163, No. 1 (2002): 340-349.

Arai, et al. Synthesis and Electrode Performance of Layered Nickel Dioxide Containing Alkaline Ions. Electrochimica Acta 50, n . 9 (2005): 1821-1828.

Arai, et al. Synthesis and Electrode Performance of Layered Nickel Dioxide Containing Alkaline Ions. Electrochimica Acta 50, No. 9 (2005): 1821-1828.

Arai, et al. Synthesis and Electrode Performance of Layered Nickel Dioxide Containing Alkaline Ions. Electrochimica Acta 50, No. 9 (2005): 1821-1828.

Arai, et al., Lithium Nickelate With Cadmium Iodide Structure. Materials Research Society Proceedings, Library Archive 575 (2000): 3-7.

Ariza, et al. Probing the Local Structure and the Role of Protons in Lithium Sorption Processes of a New Lithium-Rich Manganese Oxide. Chemistry of Materials 18, No. 7 (2006): 1885-1890.

Armstrong, et al. Demonstrating Oxygen Loss and Associated Structural Reorganization in the Lithium Battery Cathode $Li[Ni_{0.2}Li_{0.2}Mn_{0.6}]O_2$. Journal of the American Chemical Society 128, No. 26 (2006): 8694-8698.

Arunkumar, et al. Chemical and Structural Instability of the Chemically Delithiated $(1-z) Li [Li_{1/3}Mn_{2/3}] O_2 (z) Li [Co_{1-y}Ni_y]O_2$ ($0 \leq y \leq 1$ and $0 \leq z \leq 1$) Solid Solution Cathodes. Journal of Materials Chemistry 18, No. 2 (2008): 190-198.

Axmann, et al. Nickel Hydroxide as a Matrix for Unusual Valencies: the Electrochemical Behaviour of Metal (III)-Ion-Substituted Nickel Hydroxides of the Pyroaurite Type. Journal of Alloys and Compounds 246, No. 1 (1997): 232-241 (abstract only).

Axmann, et al. Formation of FeIV and NiIV by Electrochemical and Chemical Oxidation of an Iron☐Substituted Nickel(II) Hydroxide: The Direct Two☐Electron Step NiII → NiIV + 2e-. Angewandte Chemie International Edition in English 35, No. 10 (1996): 1115-1118.

Benhaddad, et al. Reactivity of Nanostructured $MnO_2$ in Alkaline Medium Studied with a Micro-Cavity Electrode: Effect of Synthesizing Temperature. ACS Applied Materials & Interfaces 1, No. 2 (2009): 424-432.

Blesa, et al. $\alpha$-$NaFeO_2$: Ionic Conductivity and Sodium Extraction. Solid State Ionics 126, No. 1 (1999): 81-87.

Blesa, et al. A New Route to $\gamma$-$Fe_2O_3$ via an Intermediate Oxyhydroxide. The Reaction of $\alpha$-$NaFeO_2$ with Benzoic Acid. Journal of Materials Chemistry 9, No. 1 (1999): 227-231.

Blesa, et al. Nonstoichiometric Spinel Ferrites Obtained From $\alpha$-$NaFeO_2$ via Molten Media Reactions. Inorganic Chemistry 41, No. 23 (2002): 5961-5967. (Abstract only).

Bolibar, et al. Synthesis, Characterization and Thermal Decomposition Study of Some Nickelnitro Derivatives. Journal of Materials Chemistry 7, No. 11 (1997): 2259-2264.

Cheng, et al. Facile Controlled Synthesis of $MnO_2$ Nanostructures of Novel Shapes and Their Application in Batteries. Inorganic Chemistry 45, No. 5 (2006): 2038-2044.

Chinese Patent Application No. 201680019845.2, Office Action, dated Feb. 3, 2020.

Chitrakar, et al. A New Type of Manganese Oxide ($MnO_2$ $0.5H_2O$) Derived from $Li_{1.6}Mn_{1.6}O_4$ and Its Lithium Ion-Sieve Properties. Chemistry of Materials 12, No. 10 (2000): 3151-3157.

Choi, et al. Proton Insertion Into Oxide Cathodes During Chemical Delithiation. Electrochemical and Solid-State Letters 9, No. 5 (2006): A241-A244.

Croguennec, et al. Structural Characterisation of the Highly Deintercalated $Li_xNi_{1.02}O_2$ Phases (With $x \leq 0.30$) Basis of a presentation given at Materials Discussion No. 3, Sep. 26-29, 2000, University of Cambridge, UK. Journal of Materials Chemistry 11, No. 1 (2001): 131-141.

Crompton, Battery Reference Book, Guidelines to battery selection, 3rd ed., Oxford: Reed Educational and Professional Publishing, Ltd. Chapter 2 (2000).

Dahn, et al. Structure and Electrochemistry of $Li_{1 \pm y}NiO_2$ and a New $Li_2 NiO_2$ Phase With the Ni $(OH)_2$ Structure. Solid State Ionics 44, No. 1 (1990): 87-97 (abstract only).

Dai et al., Preparation and Characterization of Nanostructured $MnO_2$ for Lithium Batteries, Proc. 40th Power Sources Conf., pp. 283-286 (2002).

David, et al. Structure Refinement of the Spinel-Related Phases $Li_2Mn_2O_4$ and $Li_{0.2}Mn_2O_4$. Journal of Solid State Chemistry 67, No. 2 (1987): 316-323.

(56) References Cited

OTHER PUBLICATIONS

Delmas, et al. On the Behavior of the LixNiO2 System: an Electrochemical and Structural Overview. Journal of Power Sources 68, No. 1 (1997): 120-125.
Dominko, et al. A Novel Coating Technology for Preparation of Cathodes in Li-ion Batteries. Electrochemical and Solid-State Letters 4, No. 11 (2001): A187-A190.
Dutta, et al. Chemical Synthesis and Properties of Li1-δ-xNi1+δO2 and Li[Ni2]O4. Journal of Solid State Chemistry 96, No. 1 (1992): 123-131.
Ebner, et al. The LiNiO2/Carbon Lithium-Ion Battery. Solid State Ionics 69, No. 3 (1994): 238-256.
Endres, et al. Extraction of Lithium from Spinel Phases of the System Li1+xMn2-xO4-δ. Journal of Power Sources 69, No. 1 (1997): 145-156.
European patent application No. 15717992.0, Communication Pursuant to Article 94(3) EPC, dated Mar. 7, 2018.
European Patent Application No. 16715707.2, Communication Pursuant to Article 94(3) EPC, dated Nov. 11, 2019.
European Patent Application No. 18211331.6, Extended European Search Report, dated May 23, 2019.
European Patent Application No. 20186502.9, Extended European Search Report, dated Oct. 27, 2020.
Fang, et al. Low-Temperature Synthesis of Highly Crystallized LiMn2O4 from Alpha Manganese Dioxide Nanorods. Journal of Power Sources 184, No. 2 (2008): 494-497.
Feng et al. Li+ Extraction/Insertion with Spinel-Type Lithium Manganese Oxides. Characterization of Redox-Type and Ion-Exchange-Type Sites, Langmuir 8:1861-1867 (1992).
Feng, et al. Alkali Metal Ions Insertion/Extraction Reactions with Hollandite-Type Manganese Oxide in the Aqueous Phase. Chemistry of Materials 7, No. 1 (1995): 148-153.
Feng, et al. Synthesis of Hollandite DType Manganese Dioxide with H+ Form for Lithium Rechargeable Battery. Journal of the Electrochemical Society 141, No. 10 (1994): L135-L136.
Fong, et al. A Powder Neutron Diffraction Study of λ and γ Manganese Dioxide and of LiMn2O4. Zeitschrift Fuer Kristallographie 209, No. 12 (1994): 941-945.
Franger, et al. Development of New Low Temperature Manganese Oxides as Lithium Insertion Compounds. Recent Research Developments Solid State Ionics 3 (2006): 1-22. (abstract only).
Gao, et al. Synthesis and Characterization of Li1+xMn2-x O4 for Li-Ion Battery Applications. Journal of The Electrochemical Society 143, No. 1 (1996): 100-114.
Gummow, et al. Improved Capacity Retention in Rechargeable 4 V Lithium/Lithium-Manganese Oxide (Spinel) Cells. Solid State Ionics 69, No. 1 (1994): 59-67.
Han, et al., Pure Tetravalent Nickel in γ-Type Nickel Oxyhydroxide as Secondary Battery Electrode. Journal of Materials Research 13, No. 4 (1998): 880-882.
Hill, et al. Electrochemical Synthesis of Beta-and Gamma-Manganese Dioxides Under Hydrothermal Conditions. Electrochemical and Solid-State Letters 4, No. 6 (2001): D1-D3.
Hunter, et al. Nonaqueous Electrochemistry of Lambda MnO2. Proc. Electrochem. Soc 85 (1984): 4.
Hunter, et al. Preparation of a New Crystal Form of Manganese Dioxide: λ-MnO2. Journal of Solid State Chemistry 39, No. 2 (1981): 142-147.
International Search Report and Written Opinion for PCT/US2016/024436, dated Jun. 9, 2016.
Japanese Patent Application No. 2017-502756, Notification of Reason for Rejection, dated Feb. 5, 2019.
Japanese Patent Application No. 2017-550764, Notification of Reason for Rejection, dated Sep. 6, 2019.
Japanese Patent Application No. 2020-116553, Notification of Reason for Rejection, dated Sep. 3, 2021.
Ji, et al. Simple Fabrication of Nano-Sized NiO2 Powder and its Application to Oxidation Reactions. Applied Catalysis A: General 282, No. 1 (2005): 25-30. (Abstract only).

Kanoh, et al. In Situ Raman Spectroscopic Study on Electroinsertion of Li+ into a Pt/λ☐MnO2 Electrode in Aqueous Solution. Electrochemical and Solid-State Letters 1, No. 1 (1998): 17-19.
Kanoh, et al. Selective Electroinsertion of Lithium Ions Into a Pt/λ-MnO2 Electrode in the Aqueous Phase. Langmuir 7, No. 9 (1991): 1841-1842.
Kanzaki, et al. Mechanism of Lithium Ion Insertion into λ☐MnO2. Journal of The Electrochemical Society 138, No. 1 (1991): 333-334.
Kao, et al. Phase Transformation of Gamma-EMD to Beta Manganese Dioxide During Digestion in Sulfuric Acid. Journal of The Electrochemical Society 134, No. 6 (1987): 1321-1325.
Kijima, et al. Preparation and Characterization of Open Tunnel Oxide α-MnO2 Precipitated by Ozone Oxidation. Journal of Solid State Chemistry 159, No. 1 (2001): 94-102.
Kim, et al. Direct Carbon-Black Coating on LiCoO2 Cathode Using Surfactant for High-Density Li-Ion Cell. Journal of Power Sources 139, No. 1 (2005): 289-294.
Komaba, et al. Preparation and Electrochemical Performance of Composite Oxide of Alpha Manganese Dioxide and Li—Mn—O Spinel. Electrochimica Acta 50, No. 11 (2005): 2297-2305.
Komaba, et al. Synthesis of Layered MnO2 by Calcination of KMnO4 for Rechargeable Lithium Battery Cathode. Electrochimica Acta 46, No. 1 (2000): 31-37.
Kosova, et al. Comparative Study of LiCoO2 Surface Modified with Different Oxides. Journal of Power Sources 174, No. 2 (2007): 959-964.
Kozawa. Formation of Manganate and Permanganate Ions from Manganese-Dioxide in Aqueous Solution. Journal Electrochemical Society of Japan 44, No. 8 (1976): 508-513.
Lander, et al. Barium-Nickel Oxides with Tri-and Tetravalent Nickel. Journal of the American Chemical Society 73, No. 6 (1951): 2452-2454.
Larcher, et al. Synthesis of MnO2 Phases from LiMn2O4 in Aqueous Acidic Media Mechanisms of Phase Transformations, Reactivity, and Effect of Bi Species. Journal of The Electrochemical Society 145, No. 10 (1998): 3392-3400.
Lavela, et al. Chemical Delithiation, Thermal Transformations and Electrochemical Behaviour of Iron-Substituted Lithium Nickelate. In Materials Research Society Symposium Proceedings, vol. 658, pp. GG9-7. Cambridge University Press, 2000. (Abstract only).
Lavela, et al. Effects of Partial Acid Delithiation on the Electrochemical Lithium Insertion Properties of Nickel-Stabilized LiMn2O4 Spinel Oxides. Journal of Solid State Chemistry 150, No. 1 (2000): 196-203.
Li, et al., Electrocatalytic Activities of LiCo1—yMyO2 (M=Ni or Fe) Synthesized at Low Temperature and Acid-Delithiated Products for Oxygen Evolution/Reduction in Alkaline Solution. Electrochimica Acta 46, No. 5 (2001): 717-722.
Linden and T. B. Rebby, Handbook of Batteries, New York: McGraw-Hill Co., Inc. (1995) 1.4 Classification of Cells and Batteries, pp. 1.9-1.11; 7.1 General Characteristics and Applications of Primary Batteries, pp. 7.3-7.7; 11/13 Lithium/Bismuth Oxide Cells, pp. 11-79 to 11-81; Chapter 12, Silver Oxide Cells, pp. 12.1-12-16; 23.1 General Characteristics and Applications of Secondary Batteries, pp. 23.3-23.12.
Liu, et al. Preparation and Alkali-Metal Ion Extraction/Insertion Reactions with Nanofibrous Manganese Oxide Having 2×4 Tunnel Structure. Chemistry of Materials 15, No. 19 (2003): 3696-3703.
Lu, et al. Characterization of Structure and Electrochemical Properties of Lithium Manganese Oxides for Lithium Secondary Batteries Hydrothermally Synthesized from δ-KxMnO2. Electrochimica Acta 49, No. 14 (2004): 2361-2367.
Lubin, et al. Chemical Lithium Extraction from Manganese Oxides For Lithium Rechargeable Batteries. Journal of Power Sources 34, No. 2 (1991): 161-173.
Maruta, et al. Low-Temperature Synthesis of Lithium Nickelate Positive Active Material from Nickel Hydroxide for Lithium Cells. Journal of Power Sources 90, No. 1 (2000): 89-94.
Morales, et al. Acid-Delithiated Li1-x(NiyCo1-y)1+ xO2 as Insertion Electrodes in Lithium Batteries. Journal of Solid State Chemistry 113, No. 1 (1994): 182-192. (Abstract only).

(56) References Cited

OTHER PUBLICATIONS

Morales, et al. Cation Distribution and Chemical Deintercalation of Li1-xNi1+xO2. Materials Research Bulletin 25, No. 5 (1990): 623-630.

Morales, et al. Thermal Behaviour of Chemically Deintercalated Li1-1Ni1+xO2. Journal of Thermal Analysis 38, No. 3 (1992): 295-301. (Abstract only).

Mosbah, et al. Phases LixMnO2λ Rattachees au Type Spinelle. Materials Research Bulletin 18, No. 11 (1983): 1375-1381.

Motohashi, et al. Synthesis and Properties of CoO2, the x = 0 End Member of the LixCoO2 and NaxCoO2 Systems. Chemistry of Materials 19, No. 21 (2007): 5063-5066.

Mukai, et al., Structural and Magnetic Nature for Fully Delithiated $Li_xNiO_2$: Comparative Study Between Chemically and Electrochemically Prepared Samples. The Journal of Physical Chemistry C 114, No. 18 (2010): 8626-8632.

Nishimura, et al., Manganese Dioxide Particles Produced by Ozonation in Acidic Manganese Sulfate Solutions. Shigen-to-Sozai. 107 (1991): 805-810.

Oesten, et al., Structural Aspects of Undoped and Doped Nickel Hydroxides. Ionics 2, No. 3 (1996): 293-301.

Ohzuku, et al. Electrochemistry and Structural Chemistry of LiNiO2 (R3̄m) for 4 Volt Secondary Lithium Cells. Journal of The Electrochemical Society 140, No. 7 (1993): 1862-1870.

Ohzuku, et al. Electrochemistry of Manganese Dioxide in Lithium Nonaqueous Cell III. X☐Ray Diffractional Study on the Reduction of Spinel☐Related Manganese Dioxide. Journal of The Electrochemical Society 137, No. 3 (1990): 769-775.

Ooi, et al. Lithium-Ion Insertion/Extraction Reaction with λ-MnO2 in the Aqueous Phase. Chemistry Letters 17, No. 6 (1988): 989-992.

Ooi, et al. Mechanism of Lithium (1+) Insertion in Spinel-Type Manganese Oxide. Redox And Ion-Exchange Reactions. Langmuir 7, No. 6 (1991): 1167-1171.

Palacin, et al. Low☐Temperature Synthesis of LiNiO2 Reaction Mechanism, Stability, and Electrochemical Properties. Journal of The Electrochemical Society 144, No. 12 (1997): 4226-4236.

Patrice, et al. Understanding the Second Electron Discharge Plateau in MnO2-Based Alkaline Cells. Journal of The Electrochemical Society 148, No. 5 (2001): A448-A455.

PCT International Search Report with Written Opinion in corresponding International Application No. PCT/US2015/021381, dated Aug. 11, 2015.

Puckhaber, et al. Particle Sizing-Laser Diffraction: Millennium-Link for Particle Size Analysis. Powder Handling and Processing 11, No. 1 (1999): 91-95.

Rao, et al., Electrochemical Behaviour of Solid Lithium Nickelate (LiNiO2) in an Aqueous Electrolyte System. Journal of Solid State Electrochemistry 4 (1999): 17-23.

Read, et al. Low Temperature Performance of λ MnO2 in Lithium Primary Batteries. Electrochemical and Solid-State Letters 4, No. 10 (2001): A162-A165.

Rossouw, et al. Alpha Manganese Dioxide for Lithium Batteries: a Structural and Electrochemical Study. Materials Research Bulletin 27, No. 2 (1992): 221-230.

Schilling, et al. Modification of the High-Rate Discharge Behavior of Zn—MnO2 Alkaline Cells Through the Addition of Metal Oxides to the Cathode. ITE Letters on Batteries, New Technologies & Medicine 2, No. 3 (2001): 341-348.

Schilling, et al. Thermodynamic Stability of Chemically Delithiated Li (LixMn2-x) 04. Journal of The Electrochemical Society 145, No. 2 (1998): 569-575.

Shen, et al. Phase Transitions and Ion Exchange Behavior of Electrolytically Prepared Manganese Dioxide. Journal of Solid State Chemistry 64, No. 3 (1986): 270-282.

Stoyanova, et al. Effect of Mn-Substitution for Co on the Crystal Structure and Acid Delithiation of LiMnyCo1—yO2 Solid Solutions. Solid State Ionics 73, No. 3-4 (1994): 233-240.

Stoyanova, et al. New Data on Chemical Delithiation of LixNi2—xO2 (0.6 < x<1). Journal of Solid State Chemistry 108, No. 2 (1994): 211-218.

Sun, et al. Low Temperature Synthesis of Layered LiNiO2 Cathode Material in Air Atmosphere by Ion Exchange Reaction. Solid State Ionics 177, No. 13 (2006): 1173-1177.

Takeda, et al. Crystal Chemistry and Physical Properties of La2—xSrxNiO4 (0 ≤ x≤1.6). Materials Research Bulletin 25, No. 3 (1990): 293-306.

Tang, et al. Lithium Ion Extraction from Orthorhombic LiMnO2 in Ammonium Peroxodisulfate Solutions. Journal of Solid State Chemistry 142, No. 1 (1999): 19-28.

Tang, et al. Preparation of Plate-Form Manganese Oxide by Selective Lithium Extraction from Monoclinic Li2MnO3 under Hydrothermal Conditions. Chemistry of Materials 12, No. 11 (2000): 3271-3279.

Tessier, et al., Structural and Textural Evolution of Zinc-Substituted Nickel Hydroxide Electrode Materials Upon Ageing in KOH and Upon Redox Cycling. Solid State Ionics 133, No. 1 (2000): 11-23.

Thackeray, Manganese Oxides for Lithium Batteries. Progress in Solid State Chemistry 25, No. 1 (1997): 1-71.

Venkatraman, et al. Factors Influencing the Chemical Lithium Extraction Rate from Layered LiNi1—y—zCoyMnzO2 Cathodes. Electrochemistry Communications 6, No. 8 (2004): 832-837.

Venkatraman, et al., Investigation of the Possible Incorporation of Protons into Oxide Cathodes During Chemical Delithiation. Journal of Solid State Chemistry 177, No. 11 (2004): 4244-4250.

Walanda, et al. Hydrothermal MnO2: Synthesis, Structure, Morphology and Discharge Performance. Journal of Power Sources 139, No. 4 (2005): 325-341.

Wang, et al. A Novel Chemically Synthesized Manganese Dioxide-Its Preparation and Structural Characterization. Progress in Batteries and Battery Materials 17 (1998): 222-231.

Wang, et al. Selected-Control Hydrothermal Synthesis of α- and β-MnO2 Single Crystal Nanowires. Journal of the American Chemical Society 124, No. 12 (2002): 2880-2881.

Xia et al. Study on the electrochemical performance of -MnO2 in alkaline solution, Dianyuan Jishu, vol. 23(Suppl.):74-76 (1999)(abstract only).

Yang, et al. Synthesis of Li1.33Mn1.67O4 Spinels with Different Morphologies and Their Ion Adsorptivities After Delithiation. Journal of Materials Chemistry 10, No. 8 (2000): 1903-1909.

Yang, et al., Highly Swollen Layered Nickel Oxide With A Trilayer Hydrate Structure. Chemistry of Materials 20, No. 2 (2007): 479-485.

Yin, et al. X-ray/Neutron Diffraction and Electrochemical Studies of Lithium De/Re-Intercalation in Li1-xCo1/3Ni1/3Mn1/3O2 (x=0 → 1). Chemistry of Materials 18, No. 7 (2006): 1901-1910.

Zhecheva, et al. New Phases Obtained by Acid Delithiation of Layered LiMO2 (M = Co, Ni). In Materials Science Forum, vol. 152, pp. 259-262. Trans Tech Publications, 1994.

Office Action, Australian Patent Application No. 2016243545, dated Jul. 7, 2020.

Office Action, Australian Patent Application No. 2021258092, dated Dec. 12, 2022.

\* cited by examiner though the size and color of the figures have been altered. It is believed that the invention will be better understood from the following description taken in conjunction with the accompanying drawings, in which:

BATTERY INCLUDING BETA-DELITHIATED LAYERED NICKLE OXIDE ELECTROCHEMICALLY ACTIVE CATHODE MATERIAL

CROSS-REFERENCE TO RELATED APPLICATION

This application is a continuation of U.S. patent application Ser. No. 16/222,087, filed Dec. 17, 2018, which is a continuation of U.S. patent application Ser. No. 15/785,346, filed Oct. 16, 2017, which is a continuation of U.S. patent application Ser. No. 14/672,303, filed Mar. 30, 2015, which claims the benefit under 35 U.S.C. § 119(e) of U.S. provisional patent application Ser. No. 61/971,667, filed Mar. 28, 2014, the entire disclosures of which are incorporated herein by reference.

FIELD OF THE INVENTION

The invention relates to a battery and, more specifically, relates to a battery including beta-delithiated layered nickel oxide electrochemically active cathode material.

BACKGROUND OF THE INVENTION

Electrochemical cells, or batteries, are commonly used as electrical energy sources. A battery contains a negative electrode, typically called the anode, and a positive electrode, typically called the cathode. The anode contains an electrochemically active anode material that can be oxidized. The cathode contains an electrochemically active cathode material that can be reduced. The electrochemically active anode material is capable of reducing the electrochemically active cathode material. A separator is disposed between the anode and the cathode. The battery components are disposed in a can, or housing, that is typically made from metal.

When a battery is used as an electrical energy source in an electronic device, electrical contact is made to the anode and the cathode, allowing electrons to flow through the device and permitting the respective oxidation and reduction reactions to occur to provide electrical power to the electronic device. An electrolyte is in contact with the anode, the cathode, and the separator. The electrolyte contains ions that flow through the separator between the anode and cathode to maintain charge balance throughout the battery during discharge.

There is a growing need to make batteries that are better suited to power contemporary electronic devices such as toys; remote controls; audio devices; flashlights; digital cameras and peripheral photography equipment; electronic games; toothbrushes; radios; and clocks. To meet this need, batteries may include higher loading of electrochemically active anode and/or cathode materials to provide increased capacity and service life. Batteries, however, also come in common sizes, such as the AA, AAA, AAAA, C, and D battery sizes, that have fixed external dimensions and constrained internal volumes. The ability to increase electrochemically active material loading alone to achieve better performing batteries is thus limited.

The electrochemically active cathode material of the battery is another design feature that may be adjusted in order to provide increased performance. For example, electrochemically active material that has higher volumetric and gravimetric capacity may result in a better performing battery. Similarly, electrochemically active material that has a higher oxidation state may also result in a better performing battery. The electrochemically active material that is selected, however, must provide an acceptable closed circuit voltage, or running voltage, range for the devices that the battery may power. The device may be damaged if the OCV or running voltages of the battery are too high. Conversely, the device may not function at all if the running voltage of the battery is too low. In addition, electrochemically active material, such as high oxidation state transition metal oxide, may be highly reactive. The highly reactive nature of such electrochemically active material may lead to gas evolution when the electrochemically active material is incorporated within a battery and is brought into contact with the electrolyte. Any gas that is evolved may lead to structural issues within the battery, such as continuity within the cathode, and/or leakage of electrolyte from the battery. The high oxidation state transition metal oxide may detrimentally react with other battery components, such as carbon additives, e.g., graphite; other additives, e.g., surfactant(s); and/or the separator. The high oxidation state transition metal oxide may also have a tendency to consume electrolyte, which may lead to other structural issues within the battery, such as cathode swelling, and unfavorable water balance within the battery. Also, a battery including high oxidation state transition metal oxide as an electrochemically active cathode material may, for example, exhibit instability and an elevated rate of self-discharge when the battery is stored for a period of time. In addition, the ratios of both water and potassium hydroxide content to the electrochemically active material content of the battery needs to be appropriately balanced to deliver proper utilization of the electrochemically active materials. Furthermore, the selection of suitable ratios of both water and potassium hydroxide content to electrochemically active material content may provide increased battery performance across multiple discharge rate regimes.

There exists a need to provide a battery including an electrochemically active cathode material that address the needs discussed above. The battery including beta-delithiated layered nickel oxide electrochemically active cathode material of the present invention addresses, inter alia, these needs.

SUMMARY OF THE INVENTION

In one embodiment, the invention is directed towards a battery. The battery includes a cathode, an anode, a separator between the cathode and the anode, and an electrolyte. The cathode includes a conductive additive and an electrochemically active cathode material. The electrochemically active cathode material includes a beta-delithiated layered nickel oxide. The beta-delithiated layered nickel oxide has a chemical formula. The chemical formula is $Li_xA_yNi_{1+a-z}M_zO_2 \cdot nH_2O$ where x is from about 0.02 to about 0.20; y is from about 0.03 to about 0.20; a is from about 0 to about 0.2; z is from about 0 to about 0.2; and n is from about 0 to about 1. Within the chemical formula, A is an alkali metal. The alkali metal includes potassium, rubidium, cesium, and any combination thereof. Within the chemical formula, M comprises an alkaline earth metal, a transition metal, a non-transition metal, and any combination thereof. The anode includes an electrochemically active anode material. The electrochemically active anode material includes zinc, zinc alloy, and any combination thereof.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

DETAILED DESCRIPTION OF THE INVENTION

Electrochemical cells, or batteries, may be primary or secondary. Primary batteries are meant to be discharged, e.g., to exhaustion, only once and then discarded. Primary batteries are described, for example, in David Linden, *Handbook of Batteries* (4$^{th}$ ed. 2011). Secondary batteries are intended to be recharged. Secondary batteries may be discharged and recharged many times, e.g., more than fifty times, a hundred times, or more. Secondary batteries are described, for example, in David Linden, *Handbook of Batteries* (4$^{th}$ ed. 2011). Accordingly, batteries may include various electrochemical couples and electrolyte combinations. Although the description and examples provided herein are generally directed towards primary alkaline electrochemical cells, or batteries, it should be appreciated that the invention applies to both primary and secondary batteries of aqueous, nonaqueous, ionic liquid, and solid state systems. Primary and secondary batteries of the aforementioned systems are thus within the scope of this application and the invention is not limited to any particular embodiment.

Figure 1:
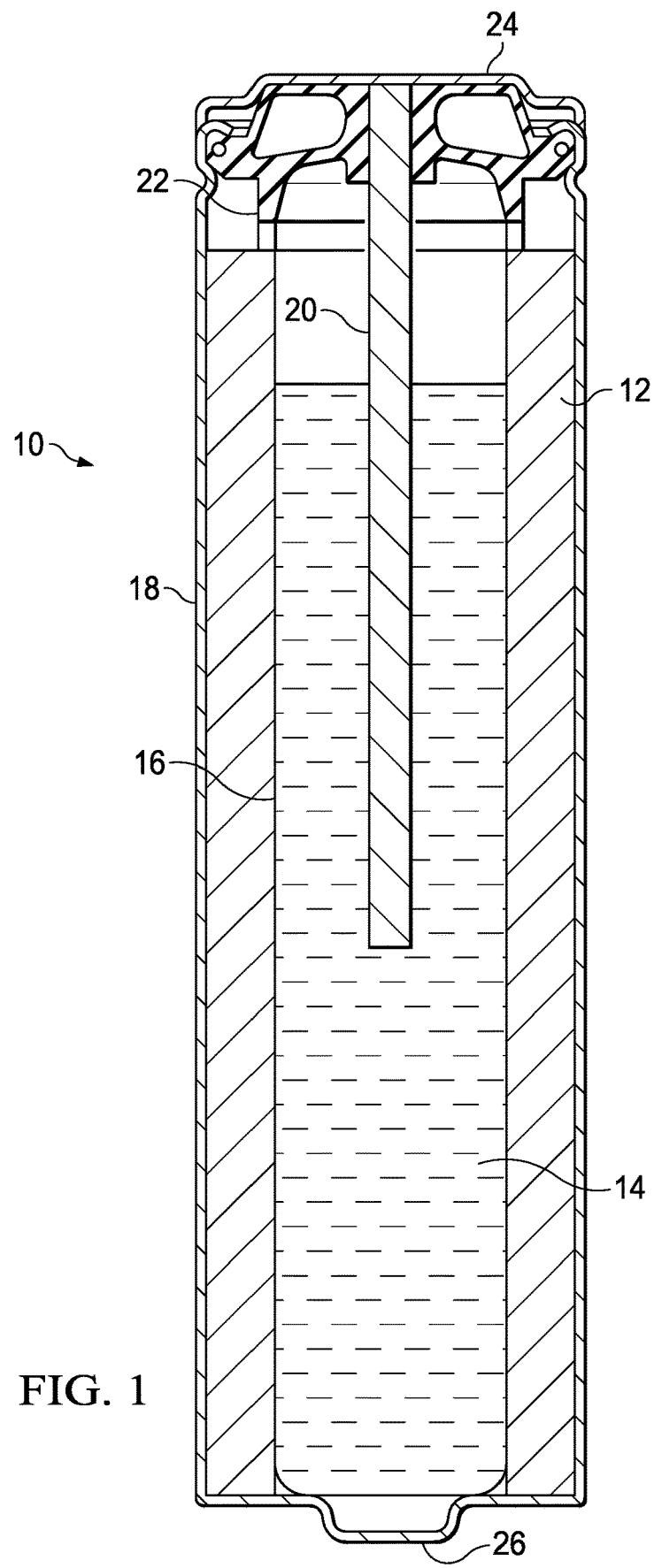
FIG. 1 is a cross-section of an embodiment of a primary alkaline battery including beta-delithiated layered nickel oxide electrochemically active cathode material.

Referring to FIG. 1, there is shown a primary alkaline electrochemical cell, or battery, 10 including a cathode 12, an anode 14, a separator 16, and a housing 18. Battery 10 also includes a current collector 20, a seal 22, and an end cap 24. The end cap 24 serves as the negative terminal of the battery 10. A positive pip 26 is at the opposite end of the battery 10 from the end cap 24. The positive pip 26 may serve as the positive terminal of the battery 10. An electrolytic solution is dispersed throughout the battery 10. The cathode 12, anode 14, separator 16, electrolyte, current collector 20, and seal 22 are contained within the housing 18. Battery 10 can be, for example, a AA, AAA, AAAA, C, or D size alkaline battery.

The housing 18 can be of any conventional type of housing commonly used in primary alkaline batteries and can be made of any suitable base material, for example cold-rolled steel or nickel-plated cold-rolled steel. The housing 18 may have a cylindrical shape. The housing 18 may be of any other suitable, non-cylindrical shape. The housing 18, for example, may have a shape comprising at least two parallel plates, such as a rectangular, square, or prismatic shape. The housing 18 may be, for example, deep-drawn from a sheet of the base material, such as cold-rolled steel or nickel-plated steel. The housing 18 may be, for example, drawn into a cylindrical shape. The housing 18 may have at least one open end. The housing 18 may have a closed end and an open end with a sidewall therebetween. The interior surface of the sidewall of the housing 18 may be treated with a material that provides a low electrical-contact resistance between the interior surface of the sidewall of the housing 18 and an electrode, such as the cathode 12. The interior surface of the sidewall of the housing 18 may be plated, e.g., with nickel, cobalt, and/or painted with a carbon-loaded paint to decrease contact resistance between, for example, the internal surface of the sidewall of the housing 18 and the cathode 12.

The cathode 12 includes at least one electrochemically active cathode material. The electrochemically active cathode material may be a beta-delithiated layered nickel oxide. The beta-delithiated layered nickel oxide may have the general chemical formula $Li_xA_yNi_{1+a-z}M_zO_2 \cdot nH_2O$ where x is from about 0.02 to about 0.20; y is from about 0.03 to about 0.20; a is from about 0 to about 0.2; z is from about 0 to about 0.2; n is from about 0 to about 1; A comprises an alkali metal; and M comprises an alkaline earth metal, a transition metal, a non-transition metal, and any combination thereof. The beta-delithiated layered nickel oxide may have the general chemical formula $Li_xA_yNi_{1+a-z}M_zO_2 \cdot nH_2O$ where x is from about 0.03 to about 0.12; y is from about 0.03 to about 0.20; a is from about 0 to about 0.2; z is from about 0 to about 0.2; n is from about 0 to about 1; A comprises an alkali metal; and M comprises an alkaline earth metal, a transition metal, a non-transition metal, and any combination thereof. The electrochemically active cathode material may have a gravimetric capacity. The beta-delithiated layered nickel oxide electrochemically active cathode material may have a gravimetric capacity greater than about 350 mAh/g. The beta-delithiated layered nickel oxide electrochemically active cathode material may have a gravimetric capacity from about 350 mAh/g to about 400 mAh/g.

Elements from Group 1A of the Periodic Table of Elements are commonly referred to as alkali metals. The alkali metal may include an element, or any combination of elements, from Group 1A of the Periodic Table of Elements. The alkali metal may comprise, for example, potassium (K), rubidium (Rb), cesium (Cs), and any combination thereof.

Elements from Group IIA of the Periodic Table of Elements are typically referred to as alkaline earth metals. The alkaline earth metal may comprise an element, or any combination of elements, from Group IIA of the Periodic Table of Elements. The alkaline earth metal may comprise, for example, magnesium (Mg).

Elements from Groups IB-VIIIB of the Periodic Table of Elements are typically referred to as transition metals. The transition metal may comprise an element, or any combination of elements, from Groups IB-VIIIB of the Period Table of Elements. The transition metal may comprise, for example, cobalt (Co), manganese (Mn), yttrium (Y), titanium (Ti), and any combination thereof.

The non-transition metal may comprise, for example, aluminum (Al), gallium (Ga), germanium (Ge), indium (In), tin (Sn), and any combination thereof.

The alkali metal may be, for example, potassium (K). The chemical formula of the beta-delithiated layered nickel oxide may be, for example, $Li_xK_yNi_{1+a-z}M_zO_2 \cdot nH_2O$ where x is from about 0.02 to about 0.20; y is from about 0.03 to about 0.20; a is from about 0 to about 0.2; z is from about 0 to about 0.2; n is from about 0 to about 1. The chemical formula of the beta-delithiated layered nickel oxide may be, for example, $Li_xK_yNi_{1+a-z}M_zO_2 \cdot nH_2O$ where x is from about 0.02 to about 0.20; y is from about 0.08 to about 0.13; a is from about 0 to about 0.2; z is from about 0 to about 0.2; n is from about 0 to about 1; and M comprises an alkaline earth metal, a transition metal, a non-transition metal, and any combination thereof. The chemical formula of the beta-delithiated layered nickel oxide may be, for example, $Li_{0.11}K_{0.11}NiO_2 \cdot 0.5H_2O$ or $Li_{0.06}K_{0.12}NiO_2 \cdot 0.53H_2O$.

The alkaline earth metal may be, for example, magnesium (Mg). The chemical formula of the beta-delithiated layered nickel oxide may be, for example, $Li_xK_yNi_{1+a-z}Mg_zO_2 \cdot nH_2O$ wherein x is from about 0.02 to about 0.2; y is from about 0.03 to about 0.2; a is from about 0 to about 0.2; z is from about 0 to about 0.2; and n is from about 0 to about 1. The chemical formula of the beta-delithiated layered nickel oxide may be, for example, $Li_{0.15}K_{0.10}Ni_{1.05}Mg_{0.04}O_2 \cdot 0.24H_2O$.

The transition metal may be, for example, cobalt (Co). The chemical formula of the beta-delithiated layered nickel oxide may be, for example, $Li_xK_yNi_{1+a-z}Co_zO_2 \cdot nH_2O$ wherein x is from about 0.02 to about 0.2; y is from about 0.03 to about 0.2; a is from about 0 to about 0.2; z is from about 0 to about 0.2; and n is from about 0 to about 1. The chemical formula of the beta-delithiated layered nickel oxide may be, for example, $Li_{0.04}K_{0.11}Ni_{0.97}Co_{0.03}O_2 \cdot nH_2O$.

The non-transition metal may be, for example, aluminum (Al). The chemical formula of the beta-delithiated layered nickel oxide may be, for example, $Li_xK_yNi_{1+a-z}Al_zO_2 \cdot nH_2O$ wherein x is from about 0.02 to about 0.2; y is from about 0.03 to about 0.2; a is from about 0 to about 0.2; z is from about 0 to about 0.2; and n is from about 0 to about 1. The chemical formula of the beta-delithiated layered nickel oxide may be, for example, $Li_{0.12}K_{0.09}Ni_{1.08}Al_{0.02}O_2 \cdot 0.18H_2O$.

The content of the alkali metal(s), alkaline earth metal(s), transition metal(s), and/or non-transition metal(s) within the beta-delithiated layered nickel oxide may be determined by any acceptable method known in the art. For example, the content of the alkali metal(s) and transition metal(s) within the beta-delithiated layered nickel oxide may be determined by inductively coupled plasma atomic emission spectroscopy (ICP-AES) and/or atomic absorption (AA) spectroscopy. ICP-AES and/or AA analyses may be completed, for example, using standard methods as described, for example, by J. R. Dean, *Practical Inductively Coupled Plasma Spectroscopy*, pp. 65-87 (2005) and B. Welz and M. B. Sperling, *Atomic Absorption Spectrometry*, pp. 221-294 ($3^{rd}$ ed. 1999). An Ultima 2 ICP spectrometer, available from HORIBA Scientific (Kyoto, Japan), may be used to complete ICP-AES analysis on a sample material, such as a beta-delithiated layered nickel oxide. ICP-AES analysis of the beta-delithiated layered nickel oxide can be performed at varying wavelengths depending upon the elements contained within the beta-delithiated layered nickel oxide.

The content of potassium, as is determined by ICP-AES, within the beta-delithiated layered nickel oxide may be less than about 7 weight percent. The content of potassium, as is determined by ICP-AES, within the beta-delithiated layered nickel oxide may be from about 3 weight percent to about 7 weight percent.

The water content within the beta-delithiated layered nickel oxide may be determined by any acceptable method known in the art. For example, the water content within the beta-delithiated layered nickel oxide may be determined by thermogravimetric analysis (TGA). TGA determines, for example, the absorbed and adsorbed water of the sample material; the water content within the crystal lattice of the sample material; and the total water content within the sample material by measuring the change in weight of the sample as a function of increasing temperature. TGA is described, for example, by R. F. Speyer, *Thermal Analysis of Materials* (1994). A Q5000 analyzer, available from TA Instruments (Newcastle, DE, USA), may be used to complete TGA on a sample material, such as a beta-delithiated layered nickel oxide.

Powder X-ray diffraction (XRD) is an analytical technique that is used to characterize the crystal lattice structure of a sample material, such as a crystalline powder. XRD analysis of a crystalline sample material will result in a characteristic diffraction pattern consisting of peaks of varying intensities, widths, and diffraction angles (peak positions) corresponding to diffraction planes in the crystal structure of the sample material. XRD patterns can be measured with an X-ray diffractometer using $CuK_\alpha$ radiation by standard methods as is described, for example, by B. D. Cullity and S. R. Stock, *Elements of X-ray Diffraction* ($3^{rd}$ ed. 2001). A D-8 Advance X-ray diffractometer, available from Bruker Corporation (Madison, WI, USA), may be used to complete powder XRD analysis on a sample material, such as a beta-delithiated layered nickel oxide.

The unit cell parameters, such as unit cell lengths and angles, of the sample material can be determined, for example, by Rietveld refinement of the XRD pattern. Rietveld refinement is described, for example, by H. M. Rietveld, *A Profile Refinement Method for Nuclear and Magnetic Structures*, 2 J. Appl. Cryst., pp. 65-71 (1969).

The crystallite size of the sample material can be determined by peak broadening of the XRD pattern of a sample material that contains a silicon (Si) standard. Peak broadening analysis may be completed, for example, by the single-peak Scherrer method or the Warren-Averbach method as is discussed, for example, by H. P. Klug and L. E. Alexander *X-ray Diffraction Procedures for Polycrystalline and Amorphous Materials*, pp. 618-694 (1974). The Warren-Averbach method may also be used to determine the residual strain and stress of the sample material.

The full width at half maximum (FWHM) can be used to characterize the relative sharpness, or broadness, of the lines in the diffraction pattern of the sample material. The FWHM can be determined by measuring the intensity of a peak; dividing the measured intensity by two to calculate half intensity (half height); and measuring the width in 2θ of the peak at the calculated half height.

The normalized intensity can be used, along with peak position, to compare the relative efficiency of diffraction associated with the particular diffraction planes within the crystal lattice of the sample material. The normalized intensity may be calculated for peaks within the same XRD pattern. All peaks of the XRD pattern may be normalized to the peak having the highest intensity (the reference peak). Normalization, which is reported in percent, occurs by dividing the intensity of the peak being normalized by the intensity of the reference peak and multiplying by 100. For example, the reference peak may have an intensity of 425 and the peak being normalized may have an intensity of 106. The normalized intensity of the peak is 25%, e.g., [(106/425)·100]. The reference peak will have a normalized intensity of 100%.

The resulting XRD pattern may be compared with known XRD patterns. The comparative XRD patterns may be generated from known sample materials. In addition, the resulting XRD pattern may be compared with known XRD patterns within, for example, the Powder Diffraction File (PDF) database, available from International Centre for Diffraction Data (Newton Square, PA, USA), or the Inorganic Crystal Structure Database (ICSD), available from FIZ Karlsruhe (Eggenstein-Leopoldshafen, Germany). The comparison to known sample materials or PDF determines if the resulting XRD pattern of the sample material is distinct, similar, or equivalent to known XRD patterns of materials. Known XRD patterns within the PDF database for comparison to, for example, beta-delithiated layered nickel oxide include PDF #00-06-0141 for beta-nickel oxyhydroxide; PDF #00-00675 for gamma-nickel oxyhydroxide; PDF #00-059-0463 for nickel oxide; PDF #00-059-0463 for beta-nickel hydroxide; and PDF #00-036-0791 for potassium hydroxide.

The beta-delithiated layered nickel oxide may have a characteristic XRD pattern. The XRD pattern may include several peaks, or combination of peaks, that are indicative of the beta-delithiated layered nickel oxide. The XRD pattern may include characteristic FWHM values for the several peaks of the beta-delithiated layered nickel oxide. The XRD pattern may also include characteristic normalized intensities for the several peaks of the beta-delithiated layered nickel oxide.

The XRD pattern of the beta-delithiated layered nickel oxide may include a first peak. The first peak may have a peak position on the XRD pattern of from about 14.9°2θ to about 16.0°2θ. The first peak may be, for example, at about 15.4°2θ. The XRD pattern of the beta-delithiated layered nickel oxide may include a second peak. The second peak may have a peak position on the XRD pattern of from about 21.3°2θ to about 22.7°2θ. The second peak may be, for example, at about 22.1°2θ. The XRD pattern of the beta-delithiated layered nickel oxide may include a third peak. The third peak may have a peak position on the XRD pattern of from about 37.1°2θ to about 37.4°2θ. The third peak may be, for example, at about 37.3°2θ. The XRD pattern of the beta-delithiated layered nickel oxide may include a fourth peak. The fourth peak may have a peak position on the XRD pattern of from about 43.2°2θ to about 44.0°2θ. The fourth peak may be, for example, at about 43.6°2θ. The XRD pattern of the beta-delithiated layered nickel oxide may include a fifth peak. The fifth peak may have a peak position on the XRD pattern of from about 59.6°2θ to about 60.6°2θ. The fifth peak may be, for example, at about 60.1°2θ. The XRD pattern of the beta-delithiated layered nickel oxide may include a sixth peak. The sixth peak may have a peak position on the XRD pattern of from about 65.4°2θ to about 65.9°2θ. The sixth peak may be, for example, at about 65.7°2θ. The XRD pattern of the beta-delithiated layered nickel oxide may include a seventh peak. The seventh peak may have a peak position on the XRD pattern of from about 10.8°2θ to about 12.0°2θ. The seventh peak may be, for example, at about 11.2°2θ. The XRD pattern of the beta-delithiated layered nickel oxide may include an eighth peak. The eighth peak may have a peak position on the XRD pattern of from about 47.2°2θ to about 47.4°2θ. The eighth peak may be, for example, at about 47.3°2θ. The XRD pattern of the beta-delithiated layered nickel oxide may include a ninth peak. The ninth peak may have a peak position on the XRD pattern of from about 48.1°2θ to about 48.6°2θ. The ninth peak may be, for example, at about 48.3°2θ.

The first peak of the XRD pattern of the beta-delithiated layered nickel oxide may have a FWHM (FWHM). The FWHM of the first peak may be from about 1.01 to about 2.09. The FWHM of the first peak may be, for example, about 1.37. The second peak of the XRD pattern of the beta-delithiated layered nickel oxide may have a FWHM. The FWHM of the second peak may be from about 0.86 to about 1.95. The FWHM of the second peak may be, for example, about 1.37. The third peak of the XRD pattern of the beta-delithiated layered nickel oxide may have a FWHM. The FWHM of the third peak may be from about 0.23 to about 0.41. The FWHM of the third peak may be, for example, about 0.28. The fourth peak of the XRD pattern of the beta-delithiated layered nickel oxide may have a FWHM. The FWHM of the fourth peak may be from about 0.40 to about 0.75. The FWHM of the fourth peak may be, for example, about 0.60. The fifth peak of the XRD pattern of the beta-delithiated layered nickel oxide may have a FWHM. The FWHM of the fifth peak may be from about 0.57 to about 1.45. The FWHM of the fifth peak may be, for example, about 0.92. The sixth peak of the XRD pattern of the beta-delithiated layered nickel oxide may have a FWHM. The FWHM of the sixth peak may be from about 0.27 to about 0.53. The FWHM of the sixth peak may be, for example, about 0.36. The seventh peak of the XRD pattern of the beta-delithiated layered nickel oxide may have a FWHM. The FWHM of the seventh peak may be from about 0.56 to about 1.73. The FWHM of the seventh peak may be, for example, about 1.13. The eighth peak of the XRD pattern of the beta-delithiated layered nickel oxide may have a FWHM. The FWHM of the eighth peak may be from about 0.08 to about 0.21. The FWHM of the eighth peak may be, for example, about 0.15. The ninth peak of the XRD pattern of the beta-delithiated layered nickel oxide may have a FWHM. The FWHM of the ninth peak may be from about 0.33 to about 0.58. The FWHM of the ninth peak may be, for example, about 0.45.

The peaks of the XRD pattern of the beta-delithiated layered nickel oxide may be normalized. The peaks of the XRD pattern may be normalized, for example, to the third peak of the XRD pattern. The normalized intensity of the first peak of the XRD pattern may be from about 13% to about 37%. The normalized intensity of the first peak of the XRD pattern may be, for example, about 24%. The normalized intensity of the second peak of the XRD pattern may be from about 6% to about 16%. The normalized intensity of the second peak of the XRD pattern may be, for example, about 10%. The normalized intensity of the third peak of the XRD pattern may be, for example, 100%. The normalized intensity of the fourth peak of the XRD pattern may be from about 45% to about 73%. The normalized intensity of the fourth peak of the XRD pattern may be, for example, about 58%. The normalized intensity of the fifth peak of the XRD pattern may be from about 7% to about 17%. The normalized intensity of the fifth peak of the XRD pattern may be, for example, about 11%. The normalized intensity of the sixth peak of the XRD pattern may be from about 41% to about 61%. The normalized intensity of the sixth peak of the XRD pattern may be, for example, about 48%. The normalized intensity of the seventh peak of the XRD pattern may be from about 2% to about 18%. The normalized intensity of the seventh peak of the XRD pattern may be, for example, about 6%. The normalized intensity of the eighth peak of the XRD pattern may be from about 8% to about 20%. The normalized intensity of the eighth peak of the XRD pattern may be, for example, about 10%. The normalized intensity of the ninth peak of the XRD pattern may be from about 6% to about 20%. The normalized intensity of the ninth peak of the XRD pattern may be, for example, about 12%.

The electrochemically active cathode material is reduced during discharge and water in the electrolyte within the battery is simultaneously consumed. This results in the formation of hydroxide and the inclusion of protons in the structure of the electrochemically active cathode material. A conventional alkaline battery, for example, may include electrolytic manganese dioxide (EMD) as the electrochemically active cathode material. In this conventional battery, one mole of water may be consumed for each mole of manganese present in the 4+ oxidation state that may be reduced to manganese in the 3+ oxidation state by a 1-electron reduction process. A non-conventional alkaline battery, for example, may include beta-delithiated layered nickel oxide as the electrochemically active cathode material. The beta-delithiated layered nickel oxide may, for example, have the chemical formula $Li_{0.06}K_{0.12}NiO_2 \cdot 0.53H_2O$. In this non-conventional battery, two moles of water may be consumed for each mole of nickel present in the 4+ oxidation state that may be reduced to nickel in the 2+ oxidation state by a 2-electron reduction process. Also in this non-conventional battery, one mole of water may be consumed for each mole of nickel present in the 3+ oxidation state that may be reduced to nickel in the 2+ oxidation state by a one-electron reduction process. Thus, the electrochemical discharge of a battery containing the beta-delithiated layered nickel oxide may require more than one mole of water per mole of nickel in order to achieve complete discharge. In addition, an excess amount of water may be required to minimize polarization of the anode during discharge and compensate for water consumed by self-discharge during storage of the battery. The amount of excess water that may be required depends on the specific chemical composition of the beta-delithiated layered nickel oxide. Water may be introduced into the battery in the aqueous alkaline electrolyte solution and as the moisture content of the beta-delithiated layered nickel oxide. The electrolyte may be distributed throughout the battery. The total amount of water present in the battery may be increased by various methods. For example, the total amount of alkaline electrolyte that may be added to the battery. Further, the amount of water in the battery may be increased by decreasing the potassium hydroxide concentration of the aqueous alkaline electrolyte solution. Generally, it may be desirable to add the smallest volume of alkaline electrolyte solution to the battery in order to maximize the internal volume available for electrochemically active material content.

The cathode 12 may also include at least one or more additional electrochemically active cathode materials. The additional electrochemically active cathode material may include manganese oxide, manganese dioxide, electrolytic manganese dioxide (EMD), chemical manganese dioxide (CMD), high power electrolytic manganese dioxide (HP EMD), lambda manganese dioxide, gamma manganese dioxide, beta manganese dioxide, and any combination thereof. Other electrochemically active cathode materials include, but are not limited to, silver oxide; nickel oxide; nickel oxyhydroxide; copper oxide; copper salts, such as copper iodate; bismuth oxide; high-valence nickel compounds; oxygen; and any combination thereof. The nickel oxide can include nickel hydroxide, nickel oxyhydroxide, cobalt oxyhydroxide-coated nickel oxyhydroxide, alpha-delithiated layered nickel oxide, and any combination thereof. The nickel hydroxide or oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel oxyhydroxide and gamma-nickel oxyhydroxide. The high-valence nickel compounds may include barium nickelate and potassium nickel periodate.

The cathode 12 may include a conductive additive, such as carbon, and a binder. The cathode 12 may also include other additives. The carbon may increase the conductivity of the cathode 12 by facilitating electron flow within the solid structure of the cathode 12. The carbon may be graphite, such as expanded graphite and natural graphite; graphene, single-walled nanotubes, multi-walled nanotubes, carbon fibers; carbon nanofibers; carbon nanoribbons; carbon nanoplatelets, and mixtures thereof. It is preferred that the amount of carbon in the cathode is relatively low, e.g., less than about 12%, less than about 10%, less than about 9%, less than about 8%, less than about 6%, less than about 3.75%, or even less than about 3.5%, for example from about 2.0% to about 3.5%. The lower carbon level enables inclusion of a higher loading of electrochemically active cathode material within the cathode 12 without increasing the volume of the cathode 12 or reducing the void volume (which must be maintained at or above a certain level to prevent internal pressure from rising too high as gas is generated within the cell) within the battery 10. Suitable graphite for use within a battery may be, for example, MX-15, SFG-15, MX-25, BNB-90 and/or BNC-30, all available from TIMCAL Carbon & Graphite (Bodio, Switzerland).

It is generally preferred that the cathode be substantially free of non-expanded graphite. While non-expanded graphite particles provide lubricity to the cathode pellet forming process, this type of graphite is significantly less conductive than expanded graphite, and thus it is necessary to use more non-expanded graphite in order to obtain the same cathode conductivity of a cathode containing expanded graphite. The cathode 12 may include low levels of non-expanded graphite. The inclusion of non-expanded graphite, however, may compromise the reduction in graphite concentration that can be obtained while maintaining an adequate level of cathode conductivity due to the lower conductivity of non-expanded graphite.

Examples of optional binders that may be used in the cathode 12 include polyethylene, polyacrylic acid, or a fluorocarbon resin, such as PVDF or PTFE. An optional binder for use within the cathode 12 may be, for example, COATHYLENE HA-1681, available from E. I. du Pont de Nemours and Company (Wilmington, DE, USA). Examples of other cathode additives are described in, for example, U.S. Pat. Nos. 5,698,315, 5,919,598, 5,997,775 and 7,351,499.

The content of electrochemically active cathode material within the cathode 12 may be referred to as the cathode loading. The loading of the cathode 12 may vary depending upon the electrochemically active cathode material used within, and the size of, the battery 10. For example, a AA battery with a beta-delithiated layered nickel oxide electrochemically active cathode material may have a cathode loading of at least about 6 grams of beta-delithiated layered nickel oxide. The cathode loading may be, for example, at least about 7 grams of beta-delithiated layered nickel oxide. The cathode loading may be, for example, between about 7.2 grams to about 11.5 grams of beta-delithiated layered nickel oxide. The cathode loading may be from about 8 grams to about 10 grams of beta-delithiated layered nickel oxide. The cathode loading may be from about 8.5 grams to about 9.5 grams of beta-delithiated layered nickel oxide. The cathode loading may be from about 9.5 grams to about 11.5 grams of beta-delithiated layered nickel oxide. The cathode loading may be from about 10.4 grams to about 11.5 grams of beta-delithiated layered nickel oxide. For a AAA battery, the cathode loading may be at least about 3 grams of beta-delithiated layered nickel oxide electrochemically active cathode material. The cathode loading may be from about 3 grams to about 5 grams of beta-delithiated layered nickel oxide. The cathode loading may be from about 3.5 grams to about 4.5 grams of beta-delithiated layered nickel oxide. The cathode loading may be from about 3.9 grams to about 4.3 grams of beta-delithiated layered nickel oxide. For a AAAA battery, the cathode loading may be from about 1.5 grams to about 2.5 grams of beta-delithiated layered nickel oxide electrochemically active cathode material. For a C battery, the cathode loading may be from about 27.0 grams to about 40.0 grams, for example about 33.5 grams, of beta-delithiated layered nickel oxide electrochemically active cathode material. For a D battery, the cathode loading may be from about 60.0 grams to about 84.0 grams, for example about 72.0 grams, of beta-delithiated layered nickel oxide electrochemically active cathode material.

The cathode components, such as active cathode material(s), carbon particles, binder, and any other additives, may be combined with a liquid, such as an aqueous potassium hydroxide electrolyte, blended, and pressed into pellets for use in the assembly of the battery 10. For optimal cathode pellet processing, it is generally preferred that the cathode pellet have a moisture level in the range of about 2% to about 5%, more preferably about 2.8% to about 4.6%. The pellets, after being placed within the housing 18 during the assembly of the battery 10, are typically re-compacted to form a uniform cathode assembly within the housing 18. The cathode pellet may have a cylindrical shape that includes a central bore. The size of the pellet may vary by the size of the battery, for example AA size, AAA size, AAAA size, C size, and D size, that the pellet will be used within. The central bore may define an inside diameter (ID) of the pellet. The inside diameter of the pellet for a AA battery may be, for example, from about 9.1 mm to about 9.9 mm. The inside diameter of the pellet for a AA battery may be, for example, from about 9.3 mm to about 9.7 mm. The inside diameter of the pellet for a AAA battery may be, for example, from about 6.6 mm to about 7.2 mm. The inside diameter of the pellet for a AAA battery may be, for example, from about 6.7 mm to about 7.1 mm. The inside diameter of the pellet for a AAAA battery may be, for example, from about 5 mm to about 5.5 mm. The inside diameter of the pellet for a C battery may be, for example, from about 16 mm to about 19 mm. The inside diameter of the pellet for a D battery may be, for example, from about 21 mm to about 25 mm.

The cathode 12 will have a porosity that may be calculated at the time of cathode manufacture. The porosity of the cathode 12 may be from about 20% to about 40%, between about 22% and about 35%, and, for example, about 26%. The porosity of the cathode 12 may be calculated at the time of manufacturing, for example after cathode pellet processing, since the porosity of the cathode 12 within the battery 10 may change over time due to, inter alia, cathode swelling associated with electrolyte wetting of the cathode and discharge of the battery 10. The porosity of the cathode 12 may be calculated as follows. The true density of each solid cathode component may be taken from a reference book, for example *Lange's Handbook of Chemistry* (16$^{th}$ ed. 2005). The solids weight of each of the cathode components are defined by the battery design. The solids weight of each cathode component may be divided by the true density of each cathode component to determine the cathode solids volume. The volume occupied by the cathode 12 within the battery 10 is defined, again, by the battery design. The volume occupied by the cathode 12 may be calculated by a computer-aided design (CAD) program. The porosity may be determined by the following formula:

$$\text{Cathode Porosity} = [1 - (\text{cathode solids volume} \div \text{cathode volume})] \times 100$$

For example, the cathode 12 of a AA battery may include about 9.0 grams of alpha-delithiated layered nickel oxide and about 0.90 grams of graphite (BNC-30) as solids within the cathode 12. The true densities of the alpha-delithiated layered nickel oxide and graphite may be, respectively, about 4.9 g/cm$^3$ and about 2.15 g/cm$^3$. Dividing the weight of the solids by the respective true densities yields a volume occupied by the alpha-delithiated layered nickel oxide of about 1.8 cm$^3$ and a volume occupied by the graphite of about 0.42 cm$^3$. The total solids volume is about 2.2 cm$^3$. The battery designer may select the volume occupied by the cathode 12 to be about 3.06 cm$^3$. Calculating the cathode porosity per the equation above [1−(2.2 cm$^3$÷3.06 cm$^3$)] yields a cathode porosity of about 0.28, or 28%.

The anode 14 can be formed of at least one electrochemically active anode material, a gelling agent, and minor amounts of additives, such as organic and/or inorganic gassing inhibitor. The electrochemically active anode material may include zinc; zinc oxide; zinc hydroxide; cadmium; iron; metal hydride, such as $AB_5(H)$, $AB_2(H)$, and $A_2B_7(H)$; alloys thereof; and any combination thereof.

The content of electrochemically active anode material within the anode 14 may be referred to as the anode loading. The loading of the anode 14 may vary depending upon the electrochemically active anode material used within, and the size of, the battery. For example, a AA battery with a zinc electrochemically active anode material may have an anode loading of at least about 3.3 grams of zinc. The anode loading may be, for example, at least about 3.5 grams, about 3.7 grams, about 3.9 grams, about 4.1 grams, about 4.3 grams, or about 4.5 grams of zinc. The anode loading may be from about 4.0 grams to about 5.5 grams of zinc. The anode loading may be from about 4.2 grams to about 5.3 grams of zinc. For example, a AAA battery with a zinc electrochemically active anode material may have an anode loading of at least about 1.8 grams of zinc. For example, the anode loading may be from about 1.8 grams to about 2.5 grams of zinc. The anode loading may be, for example, from about 1.9 grams to about 2.4 grams of zinc. For example, a AAAA battery with a zinc electrochemically active anode material may have an anode loading of at least about 0.6 grams of zinc. For example, the anode loading may be from about 0.7 grams to about 1.3 grams of zinc. For example, a C battery with a zinc electrochemically active anode material may have an anode loading of at least about 9.3 grams of zinc. For example, the anode loading may be from about 10.0 grams to about 19.0 grams of zinc. For example, a D battery with a zinc electrochemically active anode material may have an anode loading of at least about 30.0 grams of zinc. For example, the anode loading may be from about 30.0 grams to about 45.0 grams of zinc. The anode loading may be, for example, from about 33.0 grams to about 39.5 grams of zinc.

Examples of a gelling agent that may be used within the anode 14 include a polyacrylic acid; a polyacrylic acid cross-linked with polyalkenyl ether of divinyl glycol; a grafted starch material; a salt of a polyacrylic acid; a carboxymethylcellulose; a salt of a carboxymethylcellulose (e.g., sodium carboxymethylcellulose); or combinations thereof. The anode 14 may include a gassing inhibitor that may include an inorganic material, such as bismuth, tin, or indium. Alternatively, the gassing inhibitor can include an organic compound, such as a phosphate ester, an ionic surfactant or a nonionic surfactant.

The electrolyte may be dispersed throughout the cathode 12, the anode 14, and the separator 16. The electrolyte comprises an ionically conductive component in an aqueous solution. The ionically conductive component may be a hydroxide. The hydroxide may be, for example, potassium hydroxide, cesium hydroxide, and any combination thereof. The concentration of the ionically conductive component may be selected depending on the battery design and its desired performance. An aqueous alkaline electrolyte may include a hydroxide, as the ionically conductive component, in a solution with water. The concentration of the hydroxide within the electrolyte may be from about 0.20 to about 0.40, or from about 20% to about 40%, on a weight basis of the total electrolyte within the battery 10. For example, the hydroxide concentration of the electrolyte may be from about 0.25 to about 0.32, or from about 25% to about 32%, on a weight basis of the total electrolyte within the battery 10. The aqueous alkaline electrolyte may also include zinc oxide (ZnO). The ZnO may serve to suppress zinc corrosion within the anode. The concentration of ZnO included within the electrolyte may be less than about 5% by weight of the total electrolyte within the battery 10. The ZnO concentration, for example, may be from about 1% by weight to about 3% by weight of the total electrolyte within the battery 10.

The total weight of the aqueous alkaline electrolyte within a AA alkaline battery, for example, may be from about 3.0 grams to about 4.4 grams. The total weight of the electrolyte within a AA battery may be, for example, from about 3.3 grams to about 3.8 grams. The total weight of the electrolyte within a AA battery may be, for example, from about 3.4 grams to about 3.65 grams. The total weight of the aqueous alkaline electrolyte within a AAA alkaline battery, for example, may be from about 1.0 grams to about 2.0 grams. The total weight of the electrolyte within a AAA battery may be, for example, from about 1.2 grams to about 1.8 grams. The total weight of the electrolyte within a AAA battery may be, for example, from about 1.4 grams to about 1.8 grams. The total weight of the electrolyte within a AAAA battery may be from about 0.68 grams to about 1 gram, for example, from about 0.85 grams to about 0.95 grams. The total weight of the electrolyte within a C battery may be from about 11 grams to about 14 grams, for example, from about 12.6 grams to about 13.6 grams. The total weight of the electrolyte within a D battery may be from about 22 grams to about 30 grams, for example, from about 24 grams to about 29 grams.

The separator 16 comprises a material that is wettable or wetted by the electrolyte. A material is said to be wetted by a liquid when the contact angle between the liquid and the surface of the material is less than 90° or when the liquid tends to spread spontaneously across the surface of the material; both conditions normally coexist. The separator 16 may comprise a single layer, or multiple layers, of woven or nonwoven paper or fabric. The separator 16 may include a layer of, for example, cellophane combined with a layer of non-woven material. The separator 16 also can include an additional layer of non-woven material. The separator 16 may also be formed in situ within the battery 10. U.S. Pat. No. 6,514,637, for example, discloses such separator materials, and potentially suitable methods of their application. The separator material may be thin. The separator 16, for example, may have a dry material thickness of less than 250 micrometers (microns). The separator 16 may have a dry material thickness from about 50 microns to about 175 microns. The separator 16 may have a dry material thickness from about 70 microns to about 160 microns. The separator 16 may have a basis weight of about 40 g/m$^2$ or less. The separator 16 may have a basis weight from about 15 g/m$^2$ to about 40 g/m$^2$. The separator 16 may have a basis weight from from about 20 g/m$^2$ to about 30 g/m$^2$. The separator 16 may have an air permeability value. The separator 16 may have an air permeability value as defined in International Organization for Standardization (ISO) Standard 2965. The air permeability value of the separator 16 may be from about 2000 cm$^3$/cm$^2$·min @ 1 kPa to about 5000 cm$^3$/cm$^2$·min @ 1 kPa. The air permeability value of the separator 16 may be from about 3000 cm$^3$/cm$^2$·min @ 1 kPa to about 4000 cm$^3$/cm$^2$·min @ 1 kPa. The air permeability value of the separator 16 may be from about 3500 cm$^3$/cm$^2$·min @ 1 kPa to about 3800 cm$^3$/cm$^2$·min @ 1 kPa.

The current collector 20 may be made into any suitable shape for the particular battery design by any known methods within the art. The current collector 20 may have, for example, a nail-like shape. The current collector 20 may have a columnar body and a head located at one end of the columnar body. The current collector 20 may be made of metal, e.g., zinc, copper, brass, silver, or any other suitable material. The current collector 20 may be optionally plated with tin, zinc, bismuth, indium, or another suitable material presenting a low electrical-contact resistance between the current collector 20 and, for example, the anode 14. The plating material may also exhibit an ability to suppress gas formation when the current collector 20 is contacted by the anode 14.

The seal 22 may be prepared by injection molding a polymer, such as polyamide, polypropylene, polyetherurethane, or the like; a polymer composite; and any combination thereof into a shape with predetermined dimensions. The seal 22 may be made from, for example, Nylon 6,6; Nylon 6,10; Nylon 6,12; Nylon 11; polypropylene; polyetherurethane; co-polymers; composites; and any combination thereof. Exemplary injection molding methods include both the cold runner method and the hot runner method. The seal 22 may contain other known functional materials such as a plasticizer, a crystalline nucleating agent, an antioxidant, a mold release agent, a lubricant, and an antistatic agent. The seal 22 may also be coated with a sealant. The seal 22 may be moisturized prior to use within the battery 10. The seal 22, for example, may have a moisture content of from about 1.0 weight percent to about 9.0 weight percent depending upon the seal material. The current collector 20 may be inserted into and through the seal 22.

The end cap 24 may be formed in any shape sufficient to close the respective battery. The end cap 24 may have, for example, a cylindrical or prismatic shape. The end cap 24 may be formed by pressing a material into the desired shape with suitable dimensions. The end cap 24 may be made from any suitable material that will conduct electrons during the discharge of the battery 10. The end cap 24 may be made from, for example, nickel-plated steel or tin-plated steel. The end cap 24 may be electrically connected to the current collector 20. The end cap 24 may, for example, make electrical connection to the current collector 20 by being welded to the current collector 20. The end cap 24 may also include one or more apertures, such as holes, for venting any gas pressure that may build up under the end cap 24 during a gassing event within the battery 10, for example, during deep discharge or reversal of the battery 10 within a device, that may lead to rupturing of the vent. The current collector 20, the seal 22, and the end cap 24 may be collectively referred to as the end cap assembly.

The battery 10 including a cathode 12 including beta-delithiated layered nickel oxide may have an open-circuit voltage (OCV) that is measured in volts. The battery 10 may have an OCV from about 1.7 V to about 1.8 V. The battery 10 may have an OCV, for example, of about 1.76 V.

The battery 10 may have a water extractable potassium content. The water extractable potassium content within the battery 10 may be determined by any acceptable method known in the art. For example, the water extractable potassium content may be determined by ICP-AES. The details of ICP-AES are discussed above. For example, an anode/separator assembly and cathode assembly may be removed from an undischarged battery. The anode/separator assembly and cathode assembly may be washed with, for example, deionized water to prepare a sample solution. The content of potassium within the sample solution may then be determined via ICP-AES. The water extractable potassium content of the battery 10 may be from about 0.4 g to about 0.6 g. The water extractable potassium content of the battery 10 may be from about 0.01 mol to about 0.015 mol.

The battery 10 may have a water extractable potassium hydroxide content. The water extractable potassium hydroxide content may be calculated from the content of water extractable potassium determined via ICP-AES and the formula weight of potassium hydroxide (KOH). There is one mole of potassium (K) for each mole of hydroxide (OH) in potassium hydroxide. The content, in grams, of water extractable potassium determined by ICP-AES may be divided by the formula weight of potassium (39.0983 g/mol) to determine the number of moles of water extractable potassium. To obtain the weight, in grams, of water extractable potassium hydroxide, the moles of water extractable potassium may be multiplied by the formula weight of potassium hydroxide (56.1056 g/mol). The water extractable potassium hydroxide content of the battery 10 may be from about 0.5 g to about 1 g. The water extractable potassium hydroxide content of the battery 10 may be from about 0.01 mol to about 0.02 mol.

The battery 10 may have an acid extractable potassium content. The acid extractable potassium content within the battery 10 may be determined by any acceptable method known in the art. For example, the acid extractable potassium content may be determined by ICP-AES. The details of ICP-AES are discussed above. An anode/separator assembly and cathode assembly may be removed from a battery that is discharged. The anode/separator assembly and cathode assembly may be washed with, for example, sulfuric acid to prepare a sample solution. The content of potassium within the sample solution may then be determined via ICP-AES. The acid extractable potassium content of the battery 10 may be from about 0.8 g to about 1 g. The acid extractable potassium content of the battery 10 may be from about 0.02 mol to about 0.025 mol.

The battery 10 may have an acid extractable potassium hydroxide content. The acid extractable potassium hydroxide content may be calculated from the content of acid extractable potassium determined via ICP-AES and the formula weight of potassium hydroxide (KOH). There is one mole of potassium (K) for each mole of hydroxide (OH) in potassium hydroxide. The content, in grams, of acid extractable potassium determined by ICP-AES may be divided by the formula weight of potassium (39.0983 g/mol) to determine the number of moles of acid extractable potassium. To obtain the weight, in grams, of acid extractable potassium hydroxide, the moles of acid extractable potassium may be multiplied by the formula weight of potassium hydroxide (56.1056 g/mol). The acid extractable potassium hydroxide content of the battery 10 may be from about 1 g to about 1.4 g. The acid extractable potassium hydroxide content of the battery 10 may be from about 0.02 mol to about 0.025 mol.

The battery 10 may have a total water content. The total water content within the battery 10 may be determined by any acceptable method known in the art. For example, the total water content may be determined by weight change measurements. An anode/separator assembly and cathode assembly may be removed from a battery that is not discharged. The samples may be heated at an elevated temperature, for example at about 175° C., for a period of about 8 to 10 hours. The total water content of the battery 10 is the sum of: (1) the weight loss of the anode/separator assembly and (2) the weight loss of the cathode assembly. The total water content of the battery 10 may be from about 2.5 g to about 3 g. The total water content of the battery 10 may be from about 0.14 mol to about 0.17 mol.

The battery 10 may have a ratio of water extractable potassium hydroxide content to electrochemically active cathode material content. The water extractable potassium hydroxide content and the electrochemically active cathode material content may be measured in grams or moles. The water extractable potassium hydroxide content may be divided by the electrochemically active cathode material content to determine the ratio of water extractable potassium hydroxide content to electrochemically active cathode material content. The ratio of water extractable potassium hydroxide content, in grams, to the electrochemically active cathode material content, in grams, of the battery 10 may be less than about 0.1. The ratio of water extractable potassium hydroxide content, in grams, to the electrochemically active cathode material content, in grams, of the battery 10 may be from about 0.05 to about 0.1. The ratio of water extractable potassium hydroxide content, in moles, to the electrochemically active cathode material content, in moles, of the battery 10 may be less than about 0.15.

The battery 10 may have a ratio of water extractable potassium hydroxide content to electrochemically active anode material content. The water extractable potassium hydroxide content and the electrochemically active anode material content may be measured in grams or moles. The water extractable potassium hydroxide content may be divided by the electrochemically active anode material content to determine the ratio of water extractable potassium hydroxide content to electrochemically active anode material content. The ratio of water extractable potassium hydroxide content, in grams, to the electrochemically active anode material content, in grams, of the battery 10 may be less than about 0.2. The ratio of water extractable potassium hydroxide content, in moles, to the electrochemically active anode material content, in moles, of the battery 10 may be less than about 0.2.

The battery 10 may have a ratio of acid extractable potassium hydroxide content to electrochemically active cathode material content. The acid extractable potassium hydroxide content and the electrochemically active cathode material content may be measured in grams or moles. The acid extractable potassium hydroxide content may be divided by the electrochemically active cathode material content to determine the ratio of acid extractable potassium hydroxide content to electrochemically active cathode material content. The ratio of acid extractable potassium hydroxide content, in grams, to the electrochemically active cathode material content, in grams, of the battery 10 may greater than about 0.2. The ratio of acid extractable potassium hydroxide content, in moles, to the electrochemically active cathode material content, in moles, of the battery 10 may be greater than about 0.2.

The battery 10 may have a ratio of water extractable potassium content to acid extractable potassium content. The water extractable potassium content and the acid extractable potassium content may be measured in grams or moles. The water extractable potassium content may be divided by the acid extractable potassium content to determine the ratio of water extractable potassium content to acid extractable potassium content. The ratio of water extractable potassium content, in grams, to acid extractable potassium content, in grams, of battery 10 may be less than about 0.9. The ratio of water extractable potassium content, in grams, to acid extractable potassium content, in grams, of battery 10 may be from about 0.45 to about 0.75. The ratio of water extractable potassium hydroxide content, in moles, to acid extractable potassium hydroxide content, in moles, of battery 10 may be less than about 0.9.

The battery 10 may have a ratio of total water content to electrochemically active cathode material content. The total water content and the electrochemically active cathode material content may be measured in grams or moles. The total water content may be divided by the electrochemically active cathode material content to determine the ratio of total water content to electrochemically active cathode material content. The ratio of the total water content, in grams, to the electrochemically active cathode material content, in grams, may be greater than about 0.25. The ratio of the total water content, in grams, to the electrochemically active cathode material content, in grams, may be from about 0.27 to about 0.35. The ratio of the total water content, in moles, to the electrochemically active cathode material content, in moles, may be greater than about 1.7.

Batteries including beta-delithiated layered nickel oxide electrochemically active cathode materials of the present invention may have improved discharge performance for low, mid, and high drain discharge rates than, for example, conventional alkaline batteries. Batteries including beta-delithiated layered nickel oxide electrochemically active cathode materials of the present invention may have higher open circuit voltages than, for example, conventional alkaline batteries.

Figure 2:
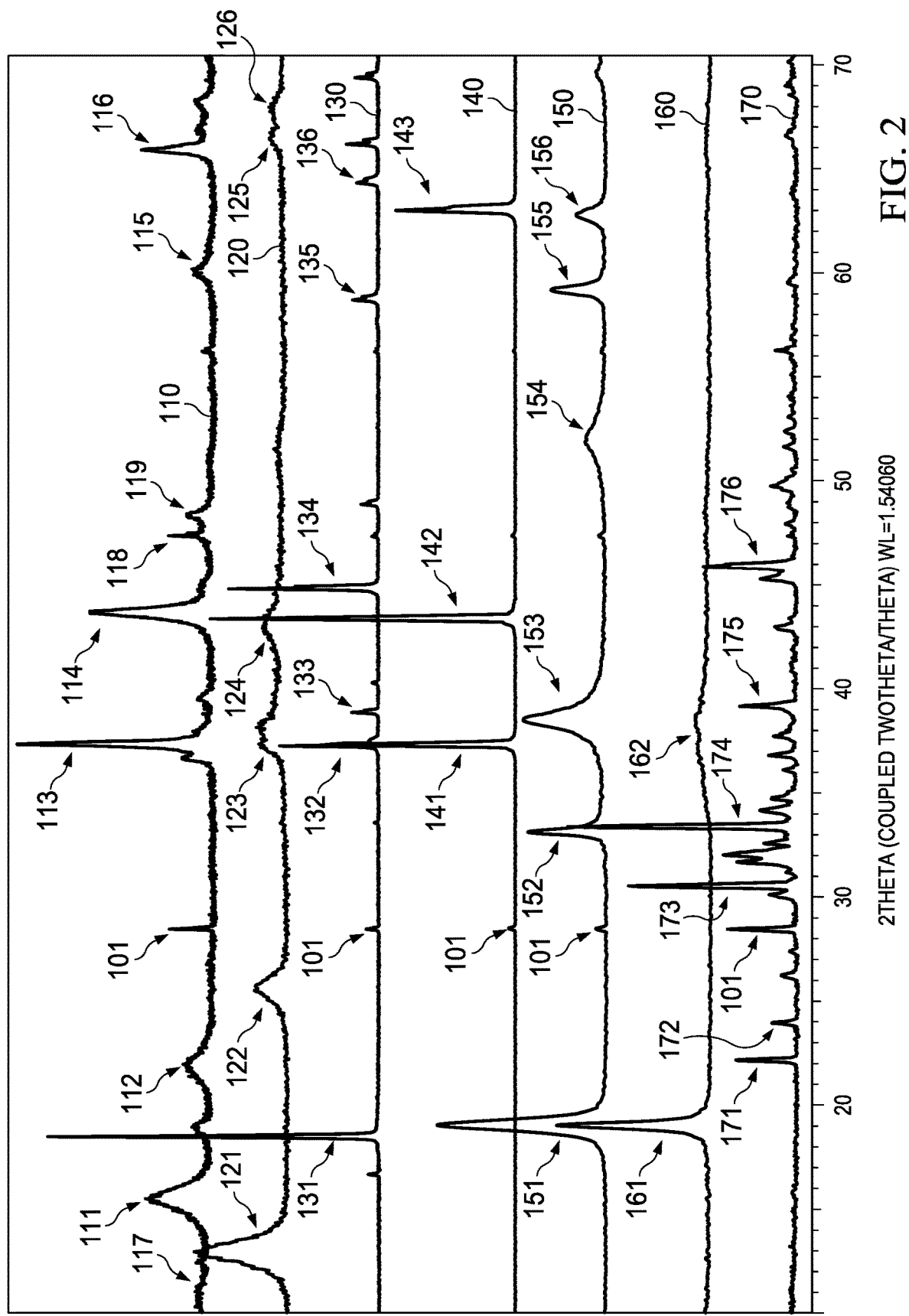
FIG. 2 includes a powder X-ray diffraction pattern for an embodiment of beta delithiated layered nickel oxide electrochemically active cathode material along with powder X-ray diffraction patterns for other materials.

Referring to FIG. 2, the XRD patterns of several sample materials are shown. An exemplary XRD pattern of a beta-delithiated layered nickel oxide 110 ($Li_{0.06}K_{0.12}NiO_2 \cdot 0.53 \cdot H_2O$) of the present invention is included within FIG. 2. The exemplary XRD pattern of the beta-delithiated layered nickel oxide 110 includes a first peak at about 15.6°2θ (111); a second peak at about 21.9°2θ (112); a third peak at about 37.3°2θ (113); a fourth peak at about 43.6°2θ (114); a fifth peak at about 59.9°2θ (115); and a sixth peak at about 65.8°2θ (116). The exemplary XRD pattern of the beta-delithiated layered nickel oxide 110 also includes a seventh peak at about 11.2°2θ (117); a eighth peak at about 47.3°2θ (118); and a ninth peak at about 48.3°2θ (119).

Still referring to FIG. 2, an exemplary XRD pattern of gamma-nickel oxyhydroxide 120 (γ-NiOOH) is shown. The XRD pattern of gamma-nickel oxyhydroxide 120 includes a first peak at about 12.8°2θ (121); a second peak at about 25.5°2θ (122); a third peak at about 37.8°2θ (123); a fourth peak at about 42.9°2θ (124); a fifth peak at about 66.3°2θ (125); and a sixth peak at about 67.7°2θ (126). The XRD pattern of the beta-delithiated layered nickel oxide differs from the XRD pattern of gamma-nickel oxyhydroxide. For example, the XRD pattern of the beta-delithiated layered nickel oxide includes, inter alia, distinct peaks within the XRD pattern at about 15.6°2θ (111); at about 21.9°2θ (112); and at about 59.9°2θ (115). The XRD pattern of gamma-nickel oxyhydroxide does not include such peaks. In addition, the XRD pattern of the beta-delithiated layered nickel oxide includes, inter alia, distinct peaks within the XRD pattern at about 11.2°2θ (117); at about 47.3°2θ (118); and at about 48.3°2θ (119). The XRD pattern of gamma-nickel oxyhydroxide does not include such peaks.

Still referring to FIG. 2, an exemplary XRD pattern of an alpha-delithiated layered nickel oxide 130 ($Li_{0.06}NiO_2$) is shown. The exemplary XRD pattern of the alpha-delithiated layered nickel oxide 130 includes a first peak at about 18.5°2θ (131); a second peak at about 37.2°2θ (132); a third peak at about 38.8°2θ (133); a fourth peak at about 44.9°2θ (134); a fifth peak at about 58.6°2θ (135); and a sixth peak at about 64.1°2θ (136). The XRD pattern of the beta-delithiated layered nickel oxide differs from the XRD pattern of the alpha-delithiated layered nickel oxide. For example, the XRD pattern of the beta-delithiated layered nickel oxide includes, inter alia, distinct peaks within the XRD pattern at about 15.6°2θ (111); at about 21.9°2θ (112); and at about 43.6°2θ (114). The XRD pattern of the alpha-delithiated layered nickel oxide does not include such a peak. In addition, the XRD pattern of the beta-delithiated layered nickel oxide includes, inter alia, distinct peaks within the XRD pattern at about 11.2°2θ (117). The XRD pattern of the alpha-delithiated layered nickel oxide does not include such a peak.

Still referring to FIG. 2, an exemplary XRD pattern of nickel oxide 140 (NiO) is shown. The XRD pattern of nickel oxide 140 includes a first peak at about 37.2°2θ (141); a second peak at about 43.3°2θ (142); and a third peak at about 62.9°2θ (143). The XRD pattern of the beta-delithiated layered nickel oxide differs from the XRD pattern of nickel oxide. For example, the XRD pattern of the beta-delithiated layered nickel oxide includes, inter alia, distinct peaks within the XRD pattern at about 15.6°2θ (111); at about 21.9°2θ (112); at about 59.9°2θ (115); and at about 65.8°2θ (116). The XRD pattern of nickel oxide does not include such peaks. In addition, the XRD pattern of the beta-delithiated layered nickel oxide includes, inter alia, distinct peaks within the XRD pattern at about 11.2°2θ (117); at about 47.3°2θ (118); and at about 48.3°2θ (119). The XRD pattern of nickel oxide does not include such peaks.

Still referring to FIG. 2, an exemplary XRD pattern of beta-nickel hydroxide 150 (β-Ni(OH)$_2$) is shown. The XRD pattern of beta-nickel hydroxide 150 includes a first peak at about 19.2°2θ (151); a second peak at about 33.1°2θ (152); a third peak at about 38.5°2θ (153); a fourth peak at about 52.2°2θ (154); a fifth peak at about 59.2°2θ (155); and a sixth peak at about 62.8°2θ (156). The XRD pattern of the beta-delithiated layered nickel oxide differs from the XRD pattern of beta-nickel hydroxide. For example, the XRD pattern of the beta-delithiated layered nickel oxide includes, inter alia, distinct peaks within the XRD pattern at about 15.6°2θ (111); at about 21.9°2θ (112); at about 43.6°2θ (114); and at about 65.8°2θ (116). The XRD pattern of beta-nickel hydroxide does not include such peaks. In addition, the XRD pattern of the beta-delithiated layered nickel oxide includes, inter alia, distinct peaks within the XRD pattern at about 11.2°2θ (117); at about 47.3°2θ (118); and at about 48.3°2θ (119). The XRD pattern of beta-nickel hydroxide does not include such peaks.

Still referring to FIG. 2, an exemplary XRD pattern of beta-nickel oxyhydroxide 160 (β-NiOOH) is shown. The XRD pattern of beta-nickel oxyhydroxide 160 includes a first peak at about 19.1°2θ (161) and a second peak at about 37.9°2θ (162). The XRD pattern of the beta-delithiated layered nickel oxide differs from the XRD pattern of beta-nickel oxyhydroxide. For example, the XRD pattern of the beta-delithiated layered nickel oxide includes, inter alia, distinct peaks within the XRD pattern at about 15.6°2θ

(111); at about 21.9°2θ (112); at about 43.6°2θ (114); at about 59.9°2θ (115); and at about 65.8°2θ (116). The XRD pattern of beta-nickel oxyhydroxide does not include such peaks. In addition, the XRD pattern of the beta-delithiated layered nickel oxide includes, inter alia, distinct peaks within the XRD pattern at about 11.2°2θ (117); at about 47.3°2θ (118); and at about 48.3°2θ (119). The XRD pattern of beta-nickel oxyhydroxide does not include such peaks.

Still referring to FIG. 2, an exemplary XRD pattern of potassium hydroxide 170 (KOH). The XRD pattern of potassium hydroxide 170 includes a first peak at about 22.1°2θ (171); a second peak at about 28.4°2θ (172); a third peak at about 30.5°2θ (173); a fourth peak at about 33.3°2θ (174); a fifth peak at about 39.1°2θ (175); and a sixth peak at about 45.8°2θ (176). The XRD pattern of the beta-delithiated layered nickel oxide differs from the XRD pattern of potassium hydroxide. For example, the XRD pattern of the beta-delithiated layered nickel oxide includes, inter alia, distinct peaks within the XRD pattern at about 15.6°2θ (111); at about 37.3°2θ (113); at about 43.6°2θ (114); at about 59.9°2θ (115); and at about 65.8°2θ (116). The XRD pattern of potassium hydroxide does not include such peaks. In addition, the XRD pattern of the beta-delithiated layered nickel oxide includes, inter alia, distinct peaks within the XRD pattern at about 11.2°2θ (117). The XRD pattern of potassium hydroxide does not include such peaks.

Still referring to FIG. 2, the XRD patterns of the beta-delithiated layered nickel oxide 110; the alpha-delithiated layered nickel oxide 130; nickel oxide 140; beta-nickel hydroxide 150; and potassium hydroxide 170 include a peak at about 28.5°2θ (101) that is indicative of the NIST 640d silicon standard. The silicon standard is used for 2θ diffraction angle calibration.

Figure 3:
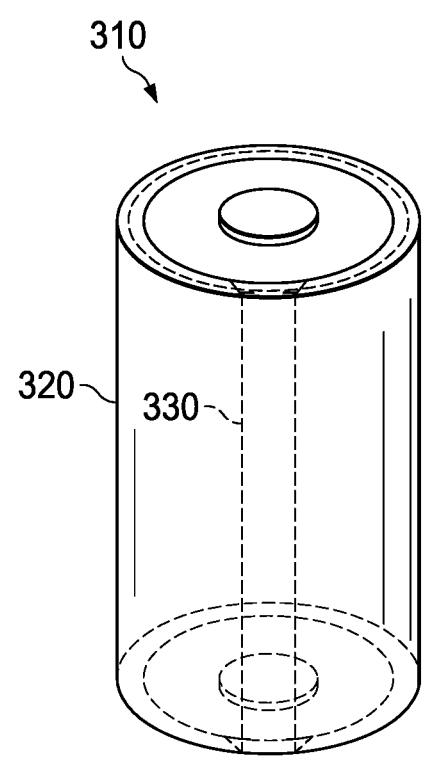
FIG. 3 is a perspective view of a primary alkaline battery including a voltage indicator.

Referring to FIG. 3, a battery including beta-delithiated layered nickel oxide electrochemically active cathode material 310 that has a label 320 that has an indicator, or tester, 330 incorporated within the label 320 to determine, for example, the voltage, capacity, state of charge, and/or power of the battery 310 is shown. The label 320 may be a laminated multi-layer film with a transparent or translucent layer bearing the label graphics and text. The label 320 may be made from polyvinyl chloride (PVC), polyethylene terephthalate (PET), and other similar polymer materials. The tester 330 may include, for example, a thermochromic or an electrochromic indicator. In a thermochromic battery tester, the indicator may be placed in electrical contact with the housing and the end cap the battery 310. The consumer activates the indicator by manually depressing a switch located within an electrical circuit included within the tester 330. Once the switch is depressed, the consumer has connected an anode of the battery 310, via the end cap, to a cathode of the battery 310, via the housing, through the thermochromic tester. The thermochromic tester may include a silver conductor that has a variable width so that the resistance of the conductor also varies along its length. The current generates heat that changes the color of a thermochromic ink display that is over the silver conductor as the current travels through the silver conductor. The tester 330 may be arranged as a gauge to indicate, for example, the relative capacity of the battery 310. The higher the current the more heat is generated and the more the gauge will change to indicate that the battery 310 is good.

EXPERIMENTAL TESTING

Elemental Analysis Via ICP-AES of Beta-Delithiated Layered Nickel Oxide Electrochemically Active Material Elemental analysis via ICP-AES is completed on a sample of beta-delithiated layered nickel oxide electrochemically active material to determine the elemental composition of the sample material. ICP-AES analysis is completed using a HORIBA Scientific Ultima 2 ICP spectrometer. ICP-AES analysis is completed by placing a sample solution within the spectrometer. The sample solution is prepared in a manner that is dependent upon the element(s) that are desired to be analyzed.

For elemental analysis, a first solution is made by adding approximately 0.15 grams of the sample material to about 20 mL of an eight normal (8N) solution of nitric acid ($HNO_3$). The first solution is heated, at about 210° C., until almost all the liquid is evaporated off. The first solution is then allowed to cool to between about 100° C. to about 150° C. A second solution is formed by adding about 10 mL of concentrated hydrochloric acid (HCl) to the first solution after the first solution has cooled. The second solution is heated, at about 210° C., until almost all the liquid is evaporated off. The second solution is then allowed to cool. A third solution is formed by adding about 10 mL of concentrated HCl to the second solution after the second solution has cooled to between about 100° C. to about 150° C. The third solution is heated, at about 210° C., until almost all liquid is evaporated off. The third solution is then placed into an oven at about 110° C. for one hour. After storage within the oven, the third solution is allowed to cool. A fourth solution is formed by adding 5 mL concentrated HCl to the third solution. The fourth solution is heated, to about 210° C., until the sample material is dissolved within the fourth solution. The fourth solution is allowed to cool. A fifth solution is formed by transferring the fourth solution to a 100 mL volumetric flask and adding distilled water, up to the 100 mL graduation mark of the volumetric flask, to the fourth solution. The fifth solution is used for elemental analysis of lithium (Li), potassium (K), and rubidium (Rb) using the ICP-AES spectrometer. A sixth solution is formed by transferring one mL of the fifth solution into a 50 mL centrifuge tube; adding about 2.5 mL of concentrated HCl to the centrifuge tube; adding distilled water to the centrifuge tube so that the total weight of the sixth solution is 50 grams; and mixing the components of the centrifuge tube. The sixth solution is used for elemental analysis of nickel (Ni) using the ICP-AES spectrometer.

ICP-AES analysis of the beta-delithiated layered nickel oxide electrochemically active material is performed at various wavelengths specific to potassium (K), lithium (Li), nickel (Ni), and rubidium (Rb). For example, the wavelength (λ) for analysis of potassium (K) within a beta-delithiated layered nickel oxide may be set at about 766 nm. For example, the wavelength (λ) for analysis of lithium (Li) within a beta-delithiated layered nickel oxide may be set at about 610 nm. For example, the wavelength (λ) for analysis of nickel (Ni) within a beta-delithiated layered nickel oxide may be set at about 231 nm. For example, the wavelength (λ) for analysis of rubidium (Rb) within a beta-delithiated layered nickel oxide may be set at about 780 nm.

Table 1 below includes the elemental analysis via ICP-AES results for the beta-delithiated layered nickel oxide electrochemically active material. The weight percent of lithium (Li), nickel (Ni), and potassium (K) within the sample material is reported. The elemental analysis via ICP-AES data is used to determine the chemical composition of the beta-delithiated layered nickel oxide electrochemically active material. The elemental analysis via ICP-AES is also used to confirm that the beta-delithiated layered nickel oxide electrochemically active material does not have undesirable side products or decomposition products within its chemical composition.

Water Content Via Thermogravimetric Analysis (TGA) of Beta-Delithiated Layered Nickel Oxide Electrochemically Active Material Water content via TGA is completed on a sample of beta-delithiated layered nickel oxide electrochemically active material to determine the absorbed/adsorbed water, the crystalline water, and total water content within the sample material. TGA analysis is completed using the TA Instruments Q5000 analyzer.

TGA analysis is conducted by placing about 34 mg of sample onto the TGA sample holder. The sample material is heated at a rate of 5° C./min to a temperature of about 800° C. The heating of the sample occurs in the presence of nitrogen that is flowing at a rate of, for example, about 25 mL/min. The sample weight is measured as a function of time and temperature.

Table 1 includes the water content that is measured via TGA for the beta-delithiated layered nickel oxide electrochemically active material. The water content that is measured via TGA is used to determine the structural lattice water present in the chemical compositions of the beta-delithiated layered nickel oxide electrochemically active material. The water content that is measured via TGA is also used to determine the water adsorbed on the surface of the beta-delithiated layered nickel oxide electrochemically active material and to confirm that no excess water is present within its composition.

TABLE 1

ICP-AES and TGA data for Beta-Delithiated Nickel Oxide Electrochemically Active Material.

| FEATURE | β-Delithiated Layered Nickel Oxide ($Li_{0.06}K_{0.12}NiO_2 \cdot 0.53H_2O$) |
|---|---|
| ICP-AES | |
| Lithium (weight percent) | 0.49% |
| Nickel (weight percent) | 65.2% |
| Potassium (weight percent) | 5.2% |
| TGA | |
| Absorbed/Adsorbed Water (weight percent) | 4 |
| Crystalline Water (weigth percent) | 10 |
| Total Water (weight percent) | 14 |

Powder X-Ray Diffraction Analyses

Powder X-ray diffraction (XRD) analysis is performed on a crystalline powder sample to determine the characteristic XRD diffraction pattern of the crystalline powder sample. XRD analysis is completed using a Bruker D-8 Advance X-ray diffractometer. XRD analysis is performed on a beta-delithiated layered nickel oxide electrochemically active material as well as several comparative samples. About one gram to about two grams of the sample material is placed within the Bruker sample holder. The sample holder including the sample material is then placed into the rotating sample stage of the X-ray diffractometer and the sample material is then irradiated by the $CuK_\alpha$ X-ray source of the diffractometer. The X-rays that are diffracted are measured by a Sol-X detector, available from Baltic Scientific Instruments (Riga, Latvia). The XRD pattern of each sample is then collected using a 0.02° step size at 2 seconds/step from 10°2θ to 80°2θ using Diffrac-plus software supplied by Bruker Corporation. The XRD pattern for the sample material is then analyzed using EVA and Topas data analysis software packages, both available from Bruker Corporation. The XRD pattern of the sample material is compared to reference XRD patterns that are measured for known materials.

Table 2 summarizes the sample and known materials analyzed and the characteristic peaks within the XRD pattern of each of the materials.

TABLE 2

Summary of the main diffraction peaks in the XRD patterns of the sample and known materials.

| SAMPLE MATERIAL | FIRST PEAK | SECOND PEAK | THIRD PEAK | FOURTH PEAK | FIFTH PEAK | SIXTH PEAK |
|---|---|---|---|---|---|---|
| β-Delithiated Layered Nickel Oxide ($Li_{0.06}K_{0.12}NiO_2 \bullet 0.53H_2O$) | 15.6 | 21.9 | 37.3 | 43.6 | 59.9 | 65.5 |
| α-Delithiated Layered Nickel Oxide ($Li_{0.06}NiO_2$) | 18.5 | 37.2 | 38.8 | 44.9 | 58.6 | 64.1 |
| β-Nickel Oxyhydroxide | 18.35 | 37.27 | — | — | — | — |
| γ-Nickel Oxyhydroxide | 12.8 | 25.6 | 37.9 | 43.2 | 66.3 | 67.7 |
| Nickel Oxide | 37.2 | 43.3 | 62.9 | — | — | — |
| β-Nickel Hydroxide | 19.2 | 33.1 | 38.5 | 52.2 | 59.2 | 62.8 |
| Potassium Hydroxide | 22.1 | 28.4 | 30.5 | 33.3 | 39.1 | 45.8 |

Assembly of AA Alkaline Primary Batteries

A conventional AA alkaline battery, referred to as Battery A in Table 3 below, is assembled. Battery A includes an anode, a cathode, a separator, and an aqueous alkaline electrolyte within a cylindrical housing. The anode includes an anode slurry containing 4.27 grams of zinc; 1.78 grams of a potassium hydroxide alkaline electrolyte with about 31% KOH by weight and 2.0% ZnO by weight dissolved in water; 0.026 grams of polyacrylic acid gellant; and 0.023 grams of corrosion inhibitor. The cathode includes a blend of electrolytic manganese dioxide (EMD), graphite, and potassium hydroxide aqueous electrolyte solution. The cathode includes a loading of 10.87 grams of EMD, 0.46 grams of Timcal MX-15 graphite, 0.12 grams of Timcal BNB-90, and 0.52 grams of electrolyte. A separator is interposed between the anode and cathode. The separator is wetted with a pre-shot of about 1.33 grams of a potassium hydroxide alkaline electrolyte solution with about 31% KOH by weight dissolved in water. The anode, cathode, and separator are inserted into a cylindrical housing. The housing is then sealed to complete the battery assembly process. Battery A then undergoes assembled battery analyses, aging, and performance testing as is described below.

An experimental AA battery, referred to as Battery B in Table 3 below, is assembled. Battery B includes an anode, a cathode, a separator, and an electrolyte within a cylindrical housing. The anode includes an anode slurry containing 5.17 grams of zinc; 2.17 grams of a potassium hydroxide alkaline electrolyte with about 27% KOH by weight and 1.7% ZnO by weight dissolved in water; 0.038 grams of polyacrylic acid gellant; and 0.01 grams of corrosion inhibitor. The cathode includes a blend of beta-delithiated layered nickel oxide, graphite, and potassium hydroxide aqueous electrolyte solution. The cathode includes a loading of 9.54 grams of a beta-delithiated layered nickel oxide, 0.78 grams Timcal MX-15 graphite, and 0.52 grams of electrolyte. A separator is interposed between the anode and cathode. The separator is wetted with a pre-shot of about 1.00 gram of a potassium hydroxide alkaline electrolyte solution with about 5.5% KOH by weight dissolved in water. The anode, cathode, and separator are inserted into a cylindrical housing. The housing is then sealed to complete the battery assembly process. Battery B then undergoes assembled battery analyses, aging, and performance testing as is described below.

TABLE 3

The design features of AA Battery A and Battery B.

| FEATURE | BATTERY A | BATTERY B |
|---|---|---|
| Anode | | |
| Zinc Amount | 4.27 g/0.0652 mol | 5.17 g/0.0791 mol |
| Gelling Agent Weight | 0.026 g | 0.038 g |
| Corrosion Inhibitor Weight | 0.023 g | 0.010 g |
| Cathode | | |
| Active Amount | 10.87 g/0.125 mol (EMD) | 9.54 g/0.0905 mol ($Li_{0.06}K_{0.12}NiO_2 \cdot 0.53H_2O$) |
| Graphite Weight | 0.58 g | 0.78 g |
| Complete Cell | | |
| Total KOH Weight | 1.168 g | 0.76 g |
| Total Water Weight | 2.593 g | 2.870 g |
| Average KOH Concentration in Electrolyte, by weight | 21% | 31% |
| Total ZnO Weight | 0.041 g | 0.063 g |

Analyses of Assembled AA Alkaline Primary Batteries

Elemental analysis via ICP-AES is completed on a water wash solution to determine the water extractable potassium content of the battery. ICP-AES analysis is completed using the HORIBA Scientific Ultima 2 ICP spectrometer. ICP-AES analysis is completed by placing a sample solution within the spectrometer.

Sample solutions for ICP-AES analysis are prepared from the anode/separator assembly and the cathode assembly that have been removed from a battery that is not discharged. Prior to removing the anode/separator assembly and the cathode assembly, the battery is completely submerged within a Dewar flask containing liquid nitrogen for a period of about five minutes to 10 minutes. This step insures that all liquid electrolyte within the battery is frozen. The battery is cut open with, for example, a Dremel tool. The end cap assembly is removed from the battery. The metal housing of the battery is peeled back. The anode/separator assembly and the cathode assembly are then removed from the battery. The anode/separator assembly and cathode assembly must be removed from the battery with care. Accidental short circuiting of the anode and cathode must be prevented so that the analytical results are not detrimentally impacted. In addition, it is necessary to minimize the loss of electrolyte solution during the disassembly process in order to accurately account for all the potassium present within the battery. The anode/separator assembly and the cathode assembly may be placed within separate, tared centrifuge tubes. The centrifuge tubes including the anode/separator assembly and the cathode assembly, respectively, are allowed to warm to approximately 22° C. Approximately 40 mL of deionized water is then added to each centrifuge tube. The centrifuge tubes are then reweighed and sealed. The sealed centrifuge tubes are then shaken for a period of twenty four hours at about 22° C. to extract any soluble potassium from the anode/separator assembly and cathode assembly, respectively. The centrifuge tubes are then placed within a centrifuge and spun to separate the solid and liquid contents within each centrifuge tube. The clear supernatant solutions are then removed from the centrifuge tubes. The content of potassium within each sample is determined via ICP-AES. The ICP-AES methodology is the same as is described above in *Elemental Analysis via ICP-AES of Beta-Delithiated Layered Nickel Oxide Electrochemically Active Material* with respect to potassium. The water extractable potassium content within the battery is the sum of: (1) the potassium content within the supernatant from the centrifugal tube including the anode/separator assembly and (2) the potassium content within the supernatant from the centrifugal tube including the cathode assembly. The water extractable potassium content of Battery A and Battery B are included within Table 4 below.

The water extractable potassium hydroxide content is calculated from the content of water extractable potassium determined via ICP-AES and the formula weight of potassium hydroxide (KOH). There is one mole of potassium (K) for each mole of hydroxide (OH) in potassium hydroxide. The content, in grams, of water extractable potassium determined by ICP-AES is divided by the formula weight of potassium (39.0983 g/mol) to determine the number of moles of water extractable potassium. To obtain the weight, in grams, of water extractable potassium hydroxide, the moles of water extractable potassium are multiplied by the formula weight of potassium hydroxide (56.1056 g/mol).

The water extractable potassium hydroxide contents of Battery A and Battery B are included within Table 4 below.

Elemental analysis via ICP-AES is completed on an acid extraction solution to determine the acid extractable potassium content of the battery. ICP-AES analysis is completed using a HORIBA Scientific Ultima 2 ICP spectrometer. ICP-AES analysis is completed by placing a sample solution within the spectrometer.

A sample for ICP-AES analysis is prepared from the anode/separator assembly and the cathode assembly that have been removed from a battery that is discharged to an open circuit voltage of less than about 1.0 volts. The discharged battery is cut open with, for example, a Dremel tool. The end cap assembly is then removed. The metal housing of the discharged battery is peeled back. The anode/separator assembly and the cathode assembly are then removed from the metal housing. The assemblies are then transferred into a 250 mL volumetric flask. About 125 mL of 6M sulfuric acid is then slowly added to the volumetric flask including the assemblies. The flask is then covered and stirred at a temperature of about 40° C. for approximately two hours. The flask is then stirred at a temperature of from about 45° C. to about 60° C. for an additional 8 to 10 hours. Approximately 100 mL of sulfuric acid is then added to the volumetric flask including the assemblies and the initial sulfuric acid. The flask is then stirred at a temperature of from about 45° C. to about 60° C. for an additional 8 to 10 hours. The flask is then allowed to cool to a temperature of about 22° C. Additional sulfuric acid is then added to the volumetric flask so that the total volume of solids and liquids within the volumetric flask is about 250 mL. The solids within the volumetric flask are then allowed to settle for at least about one hour. The supernatant liquid is then removed from the volumetric flask and placed within a centrifuge tube(s). The centrifuge tube(s) is then sealed and then placed within a centrifuge. The centrifuge tube(s) is then spun to separate any suspended solid and liquid contents within the centrifuge tube. The clear supernatant solution is then removed from the centrifuge tube(s). The content of potassium within each sample is determined via ICP-AES. The ICP-AES methodology is the same as is described above in *Elemental Analysis via ICP-AES of Beta-Delithiated Layered Nickel Oxide Electrochemically Active Material* with respect to potassium. The acid extractable potassium content within the battery is the content of potassium that is determined by ICP-AES within the solution. The acid extractable potassium content of Battery A and Battery B are included within Table 4 below.

The acid extractable potassium hydroxide content is calculated from the content of acid extractable potassium determined via ICP-AES and the formula weight of potassium hydroxide (KOH). There is one mole of potassium (K) for each mole of hydroxide (OH) in potassium hydroxide. The content, in grams, of acid extractable potassium determined by ICP-AES is divided by the formula weight of potassium (39.0983 g/mol) to determine the number of moles of acid extractable potassium. To obtain the weight, in grams, of acid extractable potassium hydroxide, the moles of acid extractable potassium are multiplied by the formula weight of potassium hydroxide (56.1056 g/mol). The acid extractable potassium hydroxide content of Battery A and Battery B are included within Table 4 below.

Weight change measurements are completed on an anode/separator assembly and a cathode assembly to determine a total water content of a battery that is not discharged. Prior to removing the anode/separator assembly and the cathode assembly, the battery is completely submerged within a Dewar flask containing liquid nitrogen for a period of about five minutes to 10 minutes. This step insures that all liquid electrolyte within the battery is frozen. Samples for weight change measurements are prepared from the anode/separator assembly and the cathode assembly that have been removed from a battery. The battery may be cut open with, for example, a Dremel tool. The metal housing of the battery may be peeled back. The anode/separator assembly and the cathode assembly may then be removed from the battery. The anode/separator assembly and the cathode assembly may be placed within separate, tared aluminum weight boats. The respective weigh boats including their contents are then reweighed. The weight boats with their contents are then placed within a box oven at about 22° C. The box oven temperature is increased at a rate of about 2° C. per minute until the box oven temperature reaches about 175° C. The weight boats, and their contents, are held within the box oven at about 175° C. for a period of about 8 to 10 hours. The box oven is then allowed to cool down to about 22° C. Each weigh boat, including its contents, is then reweighed. The total water content of the battery 10 is the sum of: (1) the weight loss of the anode/separator assembly and (2) the weight loss of the cathode assembly. The total water content of Battery A and Battery B are included within Table 4 below.

TABLE 4

Analyses of Battery A and Battery B.

| FEATURE | BATTERY A | BATTERY B |
| --- | --- | --- |
| Water Extractable Potassium (K) Content | 0.76 g/0.0194 mol | 0.45 g/0.0115 mol |
| Water Extractable Potassium Hydroxide (KOH) Content | 1.09 g/0.0194 mol | 0.64 g/0.0114 mol |
| Acid Extractable Potassium (K) Content | 0.77 g/0.0197 mol | 0.88 g/0.0225 mol |
| Acid Extractable Potassium Hydroxide (KOH) Content | 1.10 g/0.0196 mol | 1.26 g/0.0225 mol |
| Total Water ($H_2O$) Content | 2.48 g/0.138 mol | 2.73 g/0.152 mol |
| Ratio of Water Extractable KOH Content to Electrochemically Active Cathode Material Content (gram:gram) | 0.10 | 0.067 |
| Ratio of Water Extractable KOH Content to Electrochemically Active Cathode Material Content (mol:mol) | 0.155 | 0.126 |

TABLE 4-continued

Analyses of Battery A and Battery B.

| FEATURE | BATTERY A | BATTERY B |
|---|---|---|
| Ratio of Water Extractable KOH Content to Electrochemically Active Anode Material Content (mol:mol) | 0.30 | 0.14 |
| Ratio of Water Extractable K Content to Acid Extractable K Content (gram: gram) | 0.99 | 0.51 |
| Ratio of Total Water Content to Electrochemically Active Cathode Material Content (gram:gram) | 0.23 | 0.29 |
| Ratio of Total Water Content to Electrochemically Active Cathode Material Content (mol:mol) | 1.10 | 1.68 |

Performance Testing of Assembled AA Alkaline Primary Batteries

Prior to performance testing, the battery is aged for four days at about 20° C. After four days of aging, the Open Circuit Voltage (OCV) of the battery is measured. The OCV of the battery is measured by placing, for example, a voltmeter across the positive and negative terminals of the battery. The measured open circuit voltage (V) of the battery is reported. The OCV test does not consume any capacity from the battery.

After four days of aging, the Short Circuit Current (SCC) of the battery is measured. The SCC protocol includes drawing a constant current of six amperes (Amps) for a period of 0.1 seconds from the battery. The voltage of the battery is measured while under the drain of six Amps and is reported. The battery would have a measured voltage of zero (0) volts if the battery is completely short circuited. The current at which the battery would short circuit is calculated by extrapolating the line between the coordinates of the measured OCV and the measured voltage under drain to the intercept of the x-axis on an x,y plot of current versus voltage. The measured OCV has an (x,y) coordinate of (0 Amp, OCV). The measured voltage under drain has an (x,y) coordinate of (6 Amp, Load Voltage). The SSC test does not consume significant capacity from the battery due to the extremely short duration of the test. The SSC is calculated by the following formula:

$$SSC(Amps)=[(OCV \cdot 6\ Amp)/(OCV-Load\ Voltage)]$$

Performance testing includes discharge performance testing that may be referred to as the 30 Milliampere Continuous Discharge Test (30 mA Continuous). The 30 mA Continuous protocol includes drawing a constant current drain of 30 mA from the battery until the cutoff voltage of 0.9 volts is reached. The measured total capacity of the battery is reported in ampere hours (Ah) and Watt hours (Wh). The 30 mA Continuous Discharge Test is a low rate discharge test.

Performance testing includes discharge performance testing at a high rate continuous discharge regime that may be referred to as the 1 Watt Continuous Discharge test (1 W Continuous). The 1 W Continuous test protocol includes drawing a constant power drain of 1 watt from the battery until the cutoff voltage of 0.9 volts is reached. The measured capacity of the battery is reported in ampere hours (Ah) and Watt hours (Wh). The 1 W Continuous Discharge Test is a high rate discharge test.

Performance testing includes discharge performance testing at a medium rate intermittent discharge regime that may be referred to as the 250 Milliwatt Intermittent Discharge test (250 mW Intermittent). The 250 mW Intermittent test protocol includes drawing a constant power drain of 250 milliwatts from the battery for a period of one hour. The discharge is then stopped and the battery is allowed to rest for a period of seven hours. The battery is then subjected to additional periods of discharge and rest until the cutoff voltage of 0.9 volts is reached. The measured capacity of the battery is reported in ampere hours (Ah) and Watt hours (Wh). The 250 mW Intermittent Discharge Test is a medium rate intermittent discharge test.

Performance testing includes discharge performance testing designed to simulate use in digital cameras that may be referred to as the Digital Camera Test (Digicam). The Digital Camera Test is a pulse test protocol that includes applying high and medium power pulsed discharge cycles to the battery. Each cycle consists of a combination of two discharge regimes including a 1.5 Watt high power pulse for a period of 2 seconds followed immediately by a 650 mW medium power pulse for 28 seconds. This combination of discharge regimes is repeated ten times (i.e., 5 minutes total) and then the battery is allowed to rest for a period of fifty-five minutes. The combined discharge pulses and rest period cycle (i.e., 1 hour/cycle) is repeated until the cutoff voltage of 1.05 volts is reached. The number of cycles required to reach the cutoff voltage is reported as pulses or pictures. The number of pulses reported consists of the total number of 1.5 Watt high power pulses, which corresponds to the total number of discharge cycles. The Digicam Discharge Test is a high rate discharge test.

Performance Testing Results

Battery A and Battery B undergo OCV, SSC, 30 mA Continuous, 1 W Continuous, 250 mW Intermittent, and Digicam performance testing. Table 5 below summarizes the performance testing results. The % Difference column of Table 5 includes the percentage difference in performance for Battery B with respect to Battery A.

Battery B that includes beta-delithiated layered nickel oxide provides improved overall performance when compared with Battery A, a typical commercial alkaline battery. The OCV of Battery B is higher when compared with Battery A. The higher OCV of Battery B is indicative of a higher total energy as compared to Battery A. The OCV of Battery B is not too high so that the likelihood of damage when Battery B is incorporated in an electrical device is relatively low. The SSC of Battery B is significantly higher than Battery A. The higher SSC of Battery B is indicative of a greater ability to carry higher discharge currents than Battery A. The amount of current, in Ah, that is delivered by Battery B under all discharge tests, aside from the 1 W Continuous test, is greater than Battery A. The amount of energy, in Wh, that is delivered by Battery B under all discharge tests is greater than Battery A. In addition, the number of pulses that are delivered by Battery B under the Digicam test is much greater than Battery A. The results indicate that Battery B is, overall, better performing than Battery A for low rate, medium rate, and high rate discharge regimes.

TABLE 5

Performance testing results and comparisons for Battery A and Battery B.

| TEST PROTOCOL | BATTERY A | BATTERY B | % DIFFERENCE |
|---|---|---|---|
| OCV (V) | 1.62 | 1.76 | +9% |
| SSC (Amps) | 19.0 | 23.4 | +23% |
| 30 mA Continuous (Ah/Wh) | 2.86/3.62 | 3.42/5.30 | +20%/+46% |
| 1 W Continuous (Ah/Wh) | 0.90/1.02 | 0.86/1.20 | −4%/+18% |
| 250 mW Intermittent (Ah/Wh) | 2.25/2.73 | 2.97/3.25 | +32%/+19% |
| Digicam (pulses) | 108 | 396 | +267% |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A primary battery comprising:
    a cathode comprising an electrochemically active cathode material, the electrochemically active cathode material comprising a beta-delithiated layered nickel oxide and the cathode having an initial porosity at the time of manufacture of the cathode in a range of about 20% to about 40%;
    an anode;
    a separator between the cathode and the anode;
    an aqueous electrolyte comprising a hydroxide; and
    the beta-delithiated layered nickel oxide comprising a chemical formula, the chemical formula comprising $Li_xA_yNi_{1+a-z}M_zO_2 \cdot nH_2O$ wherein:
    x is from about 0.02 to about 0.20;
    y is from about 0.03 to about 0.20;
    a is from about 0 to about 0.2;
    z is from about 0 to about 0.2;
    n is from about 0 to about 1;
    A comprising an alkali metal comprising potassium, rubidium, cesium, and any combination thereof; and
    M comprising an alkaline earth metal, a transition metal, a non-transition metal, and any combination thereof.

2. The battery of claim 1, further comprising an additional electrochemically active cathode material selected from the group consisting of manganese oxide, manganese dioxide, electrolytic manganese dioxide, chemical manganese dioxide, high power electrolytic manganese dioxide, lambda manganese dioxide, gamma manganese dioxide, beta manganese dioxide, silver oxide, nickel oxide, nickel oxyhydroxide, copper oxide, copper iodate, bismuth oxide, and combinations thereof.

3. The battery of claim 1, wherein y is from about 0.08 to about 0.13.

4. The battery of claim 1, wherein A comprises potassium.

5. The battery of claim 4, wherein y is from about 0.08 to about 0.13.

6. The battery of claim 1, wherein a is from about 0.09 to about 0.10.

7. The battery of claim 1, the beta-delithiated layered nickel oxide comprising a gravimetric capacity of greater than about 350 mAh/g.

8. The battery of claim 1, the beta-delithiated layered nickel oxide comprising a gravimetric capacity from about 350 mAh/g to about 400 mAh/g.

9. The battery of claim 1, wherein x is from about 0.03 to about 0.12.

10. The battery of claim 1, wherein the beta-delithiated layered nickel oxide comprises water such that n is greater than 0.

11. The battery of claim 1, comprising an open circuit voltage of from about 1.7 volts to about 1.8 volts.

12. The battery of claim 1, wherein the anode comprises an electrochemically active anode material, the electrochemically active anode material comprising zinc, zinc alloy, or any combination thereof.

13. The battery of claim 1, further comprising:
a housing, the housing comprising an outer surface; and
a label, the label comprising a voltage tester;
wherein the label is affixed to the outer surface of the housing.

\* \* \* \* \*